(12) United States Patent
Katano et al.

(10) Patent No.: US 12,141,644 B2
(45) Date of Patent: Nov. 12, 2024

(54) CARD MEDIUM, ELECTRONIC COMPONENT FOR CARD MEDIUM, AND METAL CARD SUBSTRATE FOR CARD MEDIUM

(71) Applicant: TOPPAN INC., Tokyo (JP)

(72) Inventors: Yukiko Katano, Tokyo (JP); Misaki Nonaka, Tokyo (JP); Shinji Kaneko, Tokyo (JP)

(73) Assignee: TOPPAN INC., Tokyo (JP)

( * ) Notice: Subject to any disclaimer, the term of this patent is extended or adjusted under 35 U.S.C. 154(b) by 0 days.

(21) Appl. No.: 18/202,839

(22) Filed: May 26, 2023

(65) Prior Publication Data

US 2023/0306214 A1 Sep. 28, 2023

Related U.S. Application Data

(63) Continuation of application No. PCT/JP2021/043833, filed on Nov. 30, 2021.

(30) Foreign Application Priority Data

Dec. 2, 2020 (JP) ................................. 2020-200566
Dec. 2, 2020 (JP) ................................. 2020-200567
Dec. 2, 2020 (JP) ................................. 2020-200568

(51) Int. Cl.
*G06K 7/10* (2006.01)

(52) U.S. Cl.
CPC ................................. *G06K 7/10366* (2013.01)

(58) Field of Classification Search
CPC ......... G06K 7/10366; G06K 19/07743; H04B 1/3816

(Continued)

(56) References Cited

U.S. PATENT DOCUMENTS 6,783,077 B1 * 8/2004 Fannasch ............. G06K 19/077
257/679
8,950,681 B2 * 2/2015 Lepp .................... G06K 19/072
235/492

(Continued)

FOREIGN PATENT DOCUMENTS

CN        106897766 A    6/2017
JP        2011-521377 A  7/2011

(Continued)

OTHER PUBLICATIONS

European Extended Search Report issued in corresponding European Patent Application No. 21900588.1 dated Apr. 5, 2024 (7 pages).

(Continued)

*Primary Examiner* — Ahshik Kim

(74) *Attorney, Agent, or Firm* — Foley & Lardner LLP

(57) ABSTRACT

A card medium includes: a card body containing a metal material and having at least one aperture at a front surface thereof; an electronic component disposed in the at least one aperture and having an outer peripheral surface facing an aperture inner peripheral surface of the at least one aperture with a clearance from the aperture inner peripheral surface, at least part of the outer peripheral surface including a conductor exposed portion at which a conductor having conductive properties is exposed; a circuit substrate which is embedded into the card body and to which the electronic component is joined; and an electrical insulation portion provided between the electronic component and the aperture inner peripheral surface.

20 Claims, 16 Drawing Sheets

(58) Field of Classification Search
USPC .......................................................... 235/451
See application file for complete search history.

(56) References Cited

U.S. PATENT DOCUMENTS

| | | | | |
|---|---|---|---|---|
| 9,165,237 | B2* | 10/2015 | Scarlatella | ....... G06K 19/07739 |
| 9,424,507 | B2* | 8/2016 | Zenz | ................ G06K 19/07754 |
| 2008/0314995 | A1 | 12/2008 | Varga et al. | |
| 2013/0126622 | A1 | 5/2013 | Finn | |
| 2017/0196088 | A1* | 7/2017 | Ho | ......................... H05K 1/144 |
| 2018/0307962 | A1 | 10/2018 | Lowe et al. | |
| 2019/0102665 | A1 | 4/2019 | Snell et al. | |

FOREIGN PATENT DOCUMENTS

| | | |
|---|---|---|
| JP | 2015-513712 A | 5/2015 |
| JP | 2019-511058 A | 4/2019 |
| WO | WO-2013/110625 A1 | 8/2013 |

OTHER PUBLICATIONS

International Searching Authority, "International Search Report," issued in connection with International Patent Application No. PCT/JP2021/043833, dated Feb. 15, 2022.

International Searching Authority, "Written Opinion," issued in connection with International Patent Application No. PCT/JP2021/043833, dated Feb. 15, 2022.

* cited by examiner

CARD MEDIUM, ELECTRONIC COMPONENT FOR CARD MEDIUM, AND METAL CARD SUBSTRATE FOR CARD MEDIUM

CROSS-REFERENCE TO RELATED PATENT APPLICATIONS

This application is a continuation application filed under 35 U.S.C. § 111 (a) claiming the benefit under 35 U.S.C. §§ 120 and 365 (c) of International Patent Application No. PCT/JP2021/043833, filed on Nov. 30, 2021, which in turn claims the benefit of JP 2020-200566, filed Dec. 2, 2020; JP 2020-200567, filed Dec. 2, 2020; and, JP 2020-200568, filed Dec. 2, 2020; the disclosures of all which are incorporated herein by reference in its entirety.

TECHNICAL FIELD

The present invention relates to card media, electronic components for card media, and metal card substrates for card media.

BACKGROUND

Conventionally, there has been a wide variety of card media such as credit cards, cash cards, prepaid cards, membership cards, gift cards, and membership passes. In recent years, card media are in widespread use that have embedded therein an integrated circuit (IC) module having communications capabilities, and the like, to implement various functions (such a card medium is hereinafter simply referred to as "IC card"). Such IC cards having communications capabilities perform contactless communication with a reader/writer using an electromagnetic induction communication technology such as radio-frequency identification (RFID).

These IC cards include a card body having embedded therein a circuit substrate and elements such as an IC module and an antenna mounted on the circuit substrate. PTL 1, for example, discloses a configuration including a secure element and a fingerprint processing unit both connected to a flexible circuit substrate, and an electronic component (contact pad) electrically connected to the secure element. In the configuration disclosed in PTL 1, the electronic component is disposed so as to be exposed at the surface (front surface) of the card body. The contact pad is contained in an aperture formed at the surface of the card body.

Some credit cards have a card body formed using metal to provide a high-end feel. PTL 2, for example, discloses a configuration in which a metal sheet is used in a card body and a back panel.

CITATION LIST

[Patent Literature] PTL 1: JP 2019-511058 A; PTL 2: JP 2011-521377 A.

SUMMARY OF THE INVENTION

Technical Problem

An exposed electronic component such as a contact pad may include a wiring pattern, electrodes, a contact terminal, and the like. The wiring pattern, electrodes, contact terminal, and the like are formed by a plating process using a conductive metal. For the plating process, a conductive pattern is etched in advance on a substrate of an exposed component. Then, a plating layer is formed by plating in an area where the conductive pattern has been formed. During plating, the conductive pattern and electrodes for applying a current to the conductive pattern are connected to each other outside a formation area where the exposed component is to be formed. Accordingly, part of the conductive pattern extends outside the formation area of the exposed component on the substrate and forms a wiring portion to be electrically coupled to the electrodes. After plating, the substrate is cut by pressing working, laser processing, or the like according to the formation area of the exposed component; thus, the exposed component is obtained from the substrate. As a result, the outer peripheral portion of the obtained electronic component has an exposed cut surface of the conductor forming the wiring portion for performing the plating process.

From the viewpoint of appearance, it is desirable to minimize the gap between the electronic component such as a contact pad, which is exposed at the surface of the card body, and an inner peripheral surface of the aperture formed in the card body. However, when metal is used in the card body, and if the gap between the electronic component and the inner peripheral surface of the aperture is made small, a conductor exposed on the outer peripheral surface of the electronic y4y4 component may come into contact with the inner peripheral surface of the aperture formed in the metal-based card body, possibly resulting in an electrical short circuit.

In view of the above circumstances, an object of the present invention is to provide a card medium and an electronic component for the card medium which are capable of preventing an electrical short circuit between a card body containing a metal material and an electronic component disposed inside an aperture formed in the card body.

In view of the above circumstances, another object of the present invention is to provide a card medium capable of achieving both good exterior design of a card body containing a metal material and good operational stability of an exposed component.

In view of the above circumstances, another object of the present invention is to provide a card medium and a metal card substrate for the card medium which are capable of preventing an electrical short circuit between a card body containing a metal material and an electronic component disposed inside an aperture formed in the card body.

Solution to Problem

A card medium according to an aspect of the present invention includes:
  a card body containing a metal material, the card body having at least one aperture at a front surface thereof, the at least one aperture having an inner peripheral surface as an aperture inner peripheral surface;
  an electronic component disposed in the at least one aperture and having an outer peripheral surface facing the aperture inner peripheral surface with a clearance provided between the outer peripheral surface and the aperture inner peripheral surface, at least part of the outer peripheral surface including a conductor exposed portion at which a conductor having conductive properties is exposed;
  a circuit substrate which is embedded into the card body and to which the electronic component is joined; and an electrical insulation portion provided between the electronic component and the aperture inner peripheral surface.

An electronic component for a card medium according to an aspect of the present invention includes:
an electronic component body to be disposed inside an aperture of a card body containing a metal;
a conductor exposed portion which is formed on at least part of an outer peripheral surface of the electronic component body and at which a conductor having conductive properties is exposed; and
an outer peripheral recess portion formed at the at least part of the outer peripheral surface, the outer peripheral recess portion being recessed inward in the electronic component body.

A metal card substrate for a card medium according to an aspect of the present invention is a card substrate for a card medium, the card substrate being to form at least part of a card body of a card medium including at least one electronic component, the card substrate including:
a metal material;
at least one aperture having an inner peripheral surface as an aperture inner peripheral surface, the at least one aperture allowing the at least one electronic component to be disposed therein with a clearance from the aperture inner peripheral surface; and
an inner peripheral recess portion formed on the aperture inner peripheral surface at least one position including a portion facing a position at which a conductor exposed portion is disposed, the conductor exposed portion being a portion at which a conductor of the at least one electronic component is exposed at the clearance of the at least one aperture, the inner peripheral recess portion being recessed in a direction away from a center of the aperture.

Advantageous Effects of Invention

The present invention provides a card medium and an electronic component for the card medium which are capable of preventing an electrical short circuit between a card body containing a metal material and an electronic component disposed inside an aperture formed in the card body.

The present invention also provides a card medium capable of achieving both good exterior design of a card body containing a metal material and good operational stability of an exposed component.

The present invention also provides a card medium and a metal card substrate for the card medium which are capable of preventing an electrical short circuit between a card body containing a metal material and an electronic component disposed inside an aperture formed in the card body.

DETAILED DESCRIPTION

Figure 1:
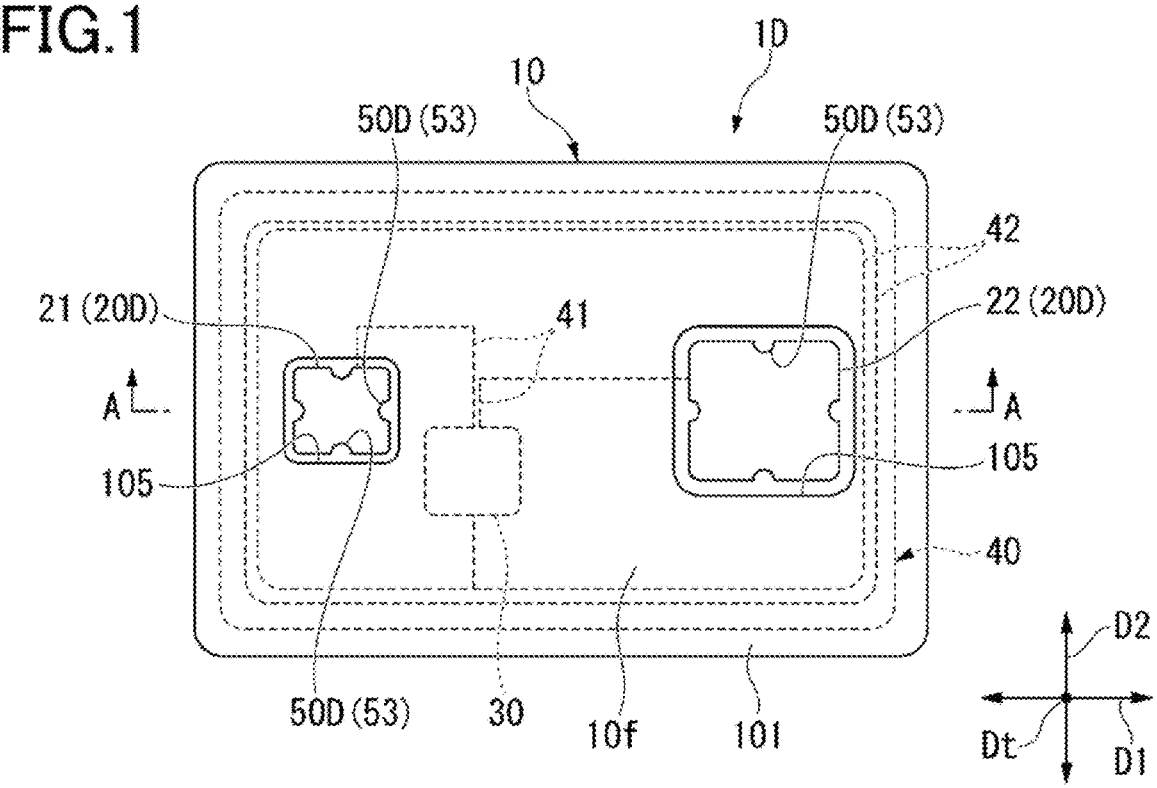
FIG. 1 is a view of the external appearance of an IC card according to a first embodiment of the present invention, viewed from its front side.

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings. Positional relationships such as vertical and horizontal directions are based on the positional relationship illustrated in the drawings unless otherwise specified.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

First Embodiment of Card Medium

An IC card according to a first embodiment will be described below with reference to FIGS. 1 to 6.

Figure 2:
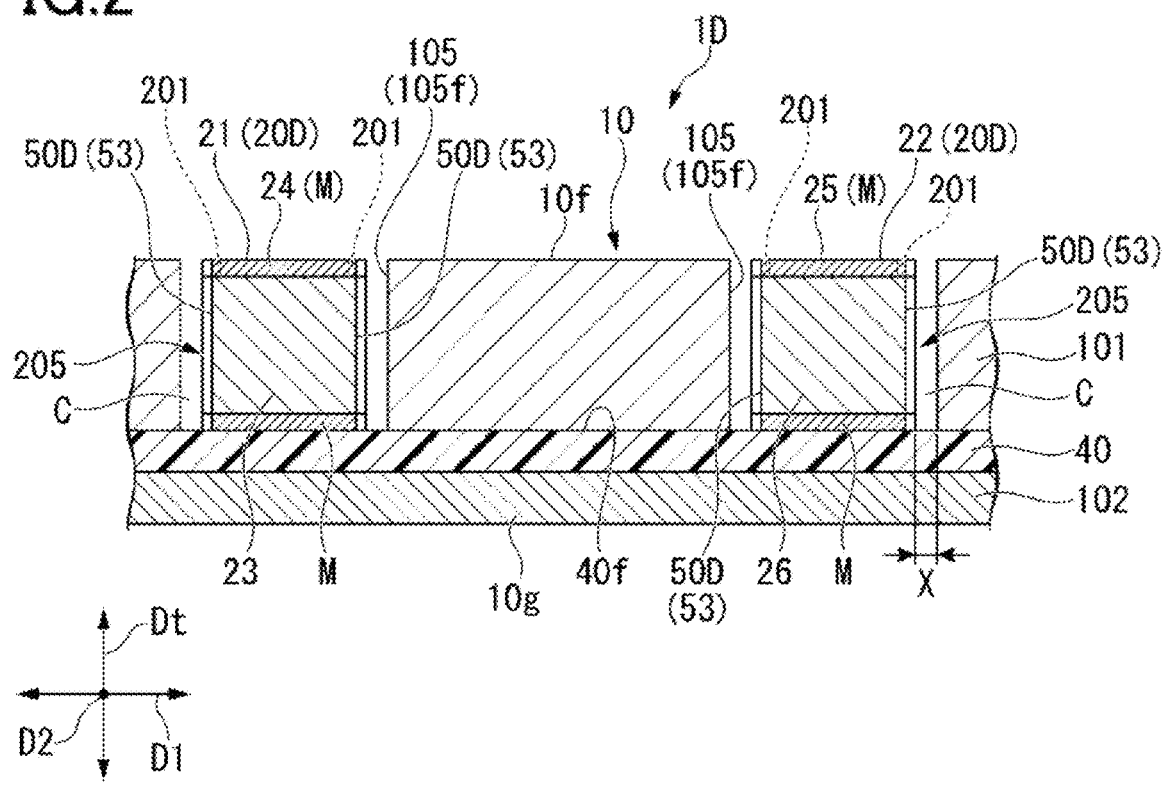
FIG. 2 is a cross-sectional view taken along line A-A in FIG. 1.

FIG. 1 is a view of the external appearance of the IC card according to the present embodiment, viewed from its front side. FIG. 2 is a cross-sectional view taken along line A-A in FIG. 1.

As illustrated in FIG. 1, an IC card (card medium) 1D mainly includes a card body 10, electronic components 20D, and a circuit substrate 40. The IC card 1D is a dual interface IC card including a contact terminal 21 and an antenna 42. The contact terminal 21 is a contact type interface. The antenna 42 is a contactless type interface. The IC card 1D has a biometric authentication function using a fingerprint sensor 22. The fingerprint sensor 22 is an example of the electronic component 20D for a card medium.

The card body 10 is formed using, for example, a metal material having conductive properties, such as stainless steel or titanium alloy. The card body 10 is formed in a rectangular plate shape when viewed in a card thickness direction Dt (see FIG. 2) that is orthogonal to a front surface 10f. The card thickness direction Dt is a direction that connects the front surface 10f and a rear surface 10g of the card body 10. In the following description, in a plane parallel to the front surface 10f of the card body 10 orthogonal to the card thickness direction Dt, a longitudinal direction of the rectangular card body 10 will be referred to as a first direction D1, and a lateral direction of the card body 10 will be referred to as a second direction D2. The thickness of the card body 10 in the card thickness direction Dt may be, for example, approximately 0.5 mm to 1.0 mm. For example, in the case where the IC card 1D is a credit card, the thickness of the card body 10 may be 0.76 mm.

As illustrated in FIG. 2, the card body 10 is composed of a plurality of sheet-like card substrates 101 and 102 stacked in the card thickness direction Dt.

A first card substrate 101 is disposed at the front surface 10f of the card body 10. The first card substrate 101 is formed from, for example, a metal material having conductive properties, such as stainless steel or titanium alloy. Apertures 105 are formed in the first card substrate 101. The contact terminal 21 and a fingerprint sensor 22 described later are disposed in the apertures 105. The apertures 105 are formed to penetrate through the first card substrate 101 in the card thickness direction Dt. The apertures 105 are formed by, for example, laser processing or cutting. The thickness of the first card substrate 101 in the card thickness direction Dt may be, for example, 100 μm to 500 μm (micrometers).

The second card substrate 102 is disposed at the rear surface 10g of the card body 10. For example, the second card substrate 102 may be formed using a plastic base material having insulation properties, for example a polyester material such as amorphous polyester, a vinyl chloride material such as polyvinyl chloride (PVC), a polycarbonate material, or a polyethylene terephthalate copolymer (PET-G). The second card substrate 102 may be, for example, formed from a metal material having conductive properties, such as stainless steel or a titanium alloy as with the first card substrate 101.

The electronic component 20D is arranged to have a part thereof exposed at the front surface 10f of the card body 10. The IC card 1D may include, for example, the contact terminal 21 and the fingerprint sensor 22 as the electronic components 20D. The contact terminal 21 and the fingerprint sensor 22 are respectively disposed in the apertures 105 formed in the card body 10. The electronic components 20D each include an electronic component body 205, conductor exposed portions 201, and outer peripheral recess portions 53.

The electronic component body 205 of the contact terminal 21 is formed in a rectangular shape when viewed in the card thickness direction Dt. The electronic component body 205 includes a substrate 23 and a terminal body 24. The substrate 23 is mainly formed from, for example, glass epoxy, polyimide (PI), or the like. Internal wiring (not illustrated) such as bonding wires is incorporated into the substrate 23. The internal wiring electrically couples the terminal body 24 and a wiring pattern 41 of the circuit substrate 40 which will be described later. A plating layer M (plating portion) may be formed on a side of the substrate 23 facing the circuit substrate 40 in the card thickness direction Dt. The plating layer M forms a connection pad or the like for achieving electrical coupling to the wiring pattern 41. The substrate 23 is joined to the circuit substrate 40, for example, through a conductive joining material (not illustrated) such as solder or silver paste. The terminal body 24 is formed on the front surface of the substrate 23. The terminal body 24 may be, for example, configured to be electrically coupled to an to external contact terminal provided in contact type external equipment such as an automated teller machine when the terminal body 24 comes into contact with the external contact terminal. The terminal body 24 is made of the plating layer M formed on the substrate 23. The terminal body 24 is formed from a metal material having conductive properties such as nickel, palladium, or gold.

The electronic component body 205 of the fingerprint sensor 22 is formed in a rectangular plate shape when viewed in the card thickness direction Dt. The electronic component body 205 includes an electrode portion 25 and a substrate 26. The substrate 26 may be, for example, joined to the circuit substrate 40 through a conductive joining material (not illustrated) such as solder or silver paste. The electrode portion 25 is formed on a surface of the substrate 26. The electrode portion 25 has a configuration in which a protective film is provided to cover a number of electrodes. The electrode portion 25 detects a fingerprint pattern of a user with a number of electrodes when a finger of the user is pressed against the electrode portion 25. Part of the electrodes of the electrode portion 25 is covered with the plating layer M (plating portion) formed on the substrate 26. The electrodes of the electrode portion 25 may be, for example, formed from a metal material having conductive properties, such as nickel, palladium, or gold. The plating layer M may be formed on a side of the substrate 26 facing the circuit substrate 40 in the card thickness direction Dt. The plating layer M forms a connection pad or the like for achieving electrical coupling to the wiring pattern 41.

The outer peripheral recess portions 53 are formed on an outer peripheral surface 21f of the contact terminal 21 and an outer peripheral surface 22f of the fingerprint sensor 22. The outer peripheral recess portion 53 is recessed in a direction away from the aperture inner peripheral surface 105f. The outer peripheral recess portion 53 is recessed inward in the electronic component body 205. The outer peripheral recess portion 53 may be, for example, formed in a semicircular shape when viewed in the card thickness direction Dt. Each outer peripheral recess portion 53 is formed at a portion of the outer peripheral surface 21f, 22f of the electronic component body 205 so as to include a conductor exposed portion 201 described later. In other words, the outer peripheral recess portion 53 is formed only at part of the outer peripheral surface 21f, 22f of the electronic component 20D.

As illustrated in FIG. 1, the IC chip 30 is embedded into the card body 10. The IC chip 30 is electrically coupled to the contact terminal 21, the fingerprint sensor 22, and the antenna 42 via the wiring pattern 41 formed on the circuit substrate 40. The IC chip 30, which is a so-called secure IC microcomputer, has a function of providing external communication via the contact terminal 21 and the antenna 42, a function of performing fingerprint authentication using the fingerprint sensor 22, and the like. As the IC chip 30, an IC chip in a publicly known configuration having a contact type communication function and a contactless type communication function can be used. The IC chip 30 is formed in a rectangular shape when viewed in the card thickness direction Dt.

The circuit substrate 40 is embedded into the card body 10 by being disposed between the first card substrate 101 and the second card substrate 102. The circuit substrate 40 is disposed inside an outer edge of the card body 10 when viewed in the card thickness direction Dt. The circuit substrate 40 has a rectangular external shape when viewed in the card thickness direction Dt. The thickness of the circuit substrate 40 in the card thickness direction Dt may be, for example, 15 μm to 50 μm.

The circuit substrate 40 is formed of a flexible circuit substrate. The circuit substrate 40 has a base substrate formed from a material having insulation properties, such as polyethylene terephthalate (PET), polyethylene naphthalate (PEN), polycarbonate (PC), polyimide (PI), or glass epoxy.

As illustrated in FIG. 2, the circuit substrate 40 is disposed closer to the rear surface 10g of the card body 10 in the card thickness direction Dt than the contact terminal 21, fingerprint sensor 22, and IC chip 30 are. The contact terminal 21, fingerprint sensor 22, and IC chip 30 are mounted on a substrate surface 40f (mounting surface) that faces in the same direction as the front surface 10f of the card body 10.

The wiring pattern 41 is formed on the surface of the circuit substrate 40 by etching. The wiring pattern 41 is formed from, for example, a conductive thin film such as of aluminum or copper. The wiring pattern 41 electrically couples (connects) the contact terminal 21, the fingerprint sensor 22, and the antenna 42 described later, with the IC chip 30.

The antenna 42 is provided on the circuit substrate 40. The antenna 42 is formed in a rectangular shape, along a periphery of the circuit substrate 40, when viewed in the card thickness direction Dt. One turn or two or more turns of the antenna 42 is formed along the periphery of the circuit substrate 40. The antenna 42 may be, for example, formed so as to constitute part of the wiring pattern 41 formed on the circuit substrate 40. The antenna 42 may be separate from the circuit substrate 40. In the case where the antenna 42 is formed separately from the circuit substrate 40, the antenna 42 can be also formed by, for example, providing a metal plate, a metal foil, or a metal wire formed in a predetermined antenna shape. In this case, the antenna 42 may be joined to the wiring pattern 41 of the circuit substrate 40 through soldering, welding, pressure welding, or the like.

Figure 3:
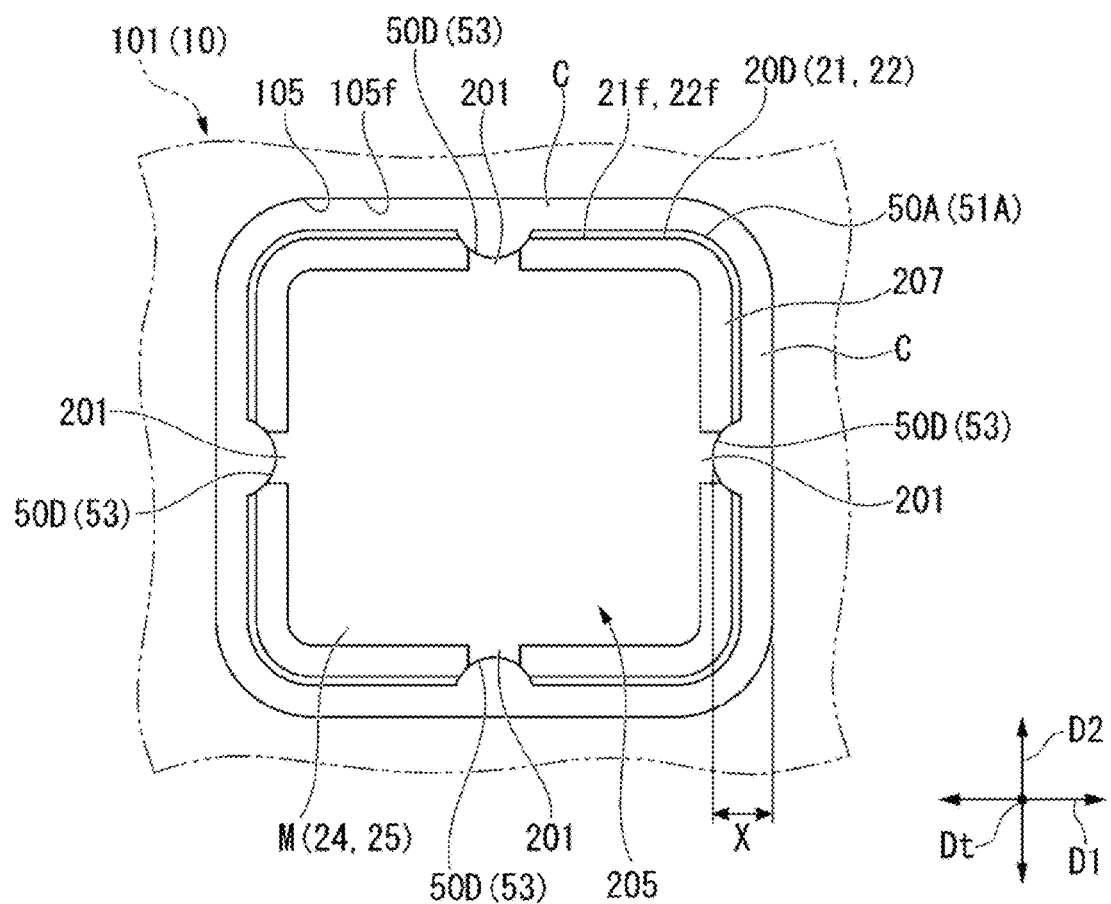
FIG. 3 is a plan view illustrating an electronic component contained in an aperture of a card body.

FIG. 3 is a plan view illustrating the electronic component disposed in the aperture of the card body 10. The contact terminal 21 and the fingerprint sensor 22 are arranged in the respective apertures 105 in the same manner; thus, FIG. 3 illustrates a case where the electronic component is the contact terminal 21 and a case where the electronic component is the fingerprint sensor 22 in one drawing.

Each of the contact terminal 21 and the fingerprint sensor 22, which are the electronic components 20D, is disposed with a clearance C provided from the aperture inner peripheral surface 105f of the aperture 105. As illustrated in FIG. 3, the terminal contact portion 21 and the fingerprint sensor 22 respectively have outer peripheral surfaces 21f and 22f. Each of the outer peripheral surfaces 21f and 22f is disposed to face the aperture inner peripheral surface 105f of the aperture 105 with the clearance C provided from the aperture inner peripheral surface 105f. Each of the outer peripheral surfaces 21f and 22f is disposed to face the aperture inner peripheral surface 105f with the clearance C provided from the aperture inner peripheral surface 105f in each of the first direction D1 and the second direction D2. Conductor exposed portions 201 are formed on parts of the outer peripheral surface 21f of the contact terminal 21 and parts of the outer peripheral surface 22f of the fingerprint sensor 22.

The aperture 105 has a size that allows the electronic component to be disposed with the clearance provided from the aperture inner peripheral surface 105f.

The conductor exposed portion 201 is made of a conductor having conductive properties in the contact terminal 21. The conductor exposed portion 201 is produced when the terminal body 24 made of the plating layer M is formed by a plating process.

Figure 4:
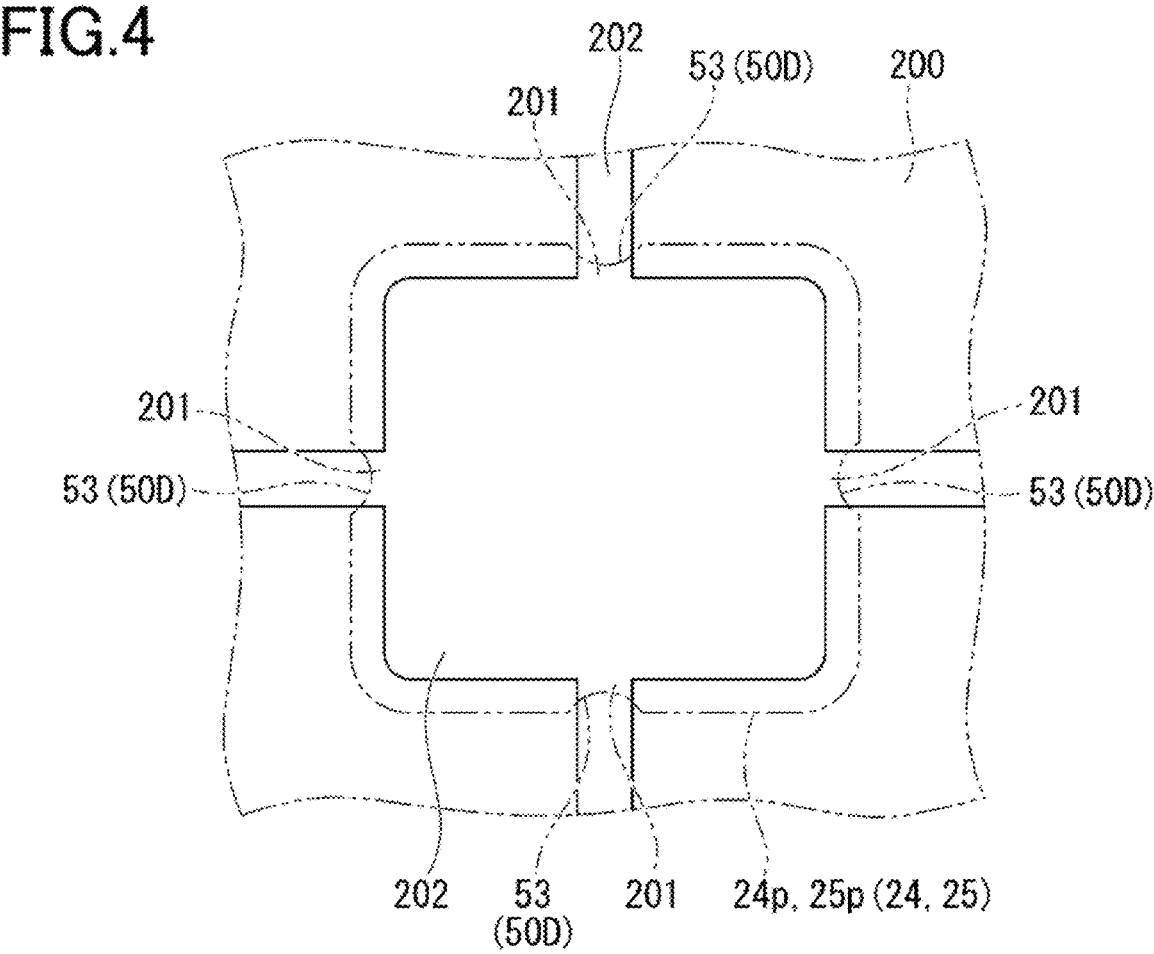
FIG. 4 is a plan view illustrating a wiring portion formed for performing a plating process when the electronic component is formed.

FIG. 4 is a plan view illustrating the conductive pattern formed on the substrate 200 of the electrode portion 25. The conductive pattern is formed for performing a plating process when forming the exposed component.

When a plate process for forming the terminal body 24 or the electrode portion 25 is performed, the conductive pattern 202 is formed in advance by etching on the substrate 200 of the terminal body 24 or the electrode portion 25. Then, the plating layer M is formed at a portion where the conductive pattern 202 is formed, by connecting electrodes to the conductive pattern 202 and immersing the substrate 200 in a plating solution while applying a current. In this situation, the electrodes are connected to the conductive pattern 202 on the substrate 200 outside a region 24p where the terminal body 24 is to be formed or a region 25p where the electrode portion 25 is to be formed. Thus, part of the conductive pattern 202 extends outside the region 24p where the terminal body 24 is to be formed or the region 25p where the electrode portion 25 is to be formed in the substrate 200. After the plating layer M is formed in the substrate 200, the substrate 200 is cut through press working, laser processing, or the like, in accordance with the region 24p where the terminal body 24 is to be formed and the region 25p where the electrode portion 25 is to be formed. As a result, the terminal body 20D and the electrode portion 21 as the electronic components 22 are obtained. A cut surface of the conductive pattern 202, that is, the conductor exposed portion 201, where the conductor is exposed, is formed at parts of the outer peripheral surface 21f of the contact terminal 21 and the outer peripheral surface 22f of the fingerprint sensor 22 obtained in this manner.

As illustrated in FIG. 2 and FIG. 3, the IC card 1D includes electrical insulation portions 50D between the contact terminal 21 or the fingerprint sensor 22, which is the electronic component 20D, and the aperture inner peripheral surface 105f. In the present embodiment, the outer peripheral recess portions 53 constitute the respective electrical insulation portions. In other words, as a result of the outer peripheral recess portions 53 being formed to be recessed so as to be sufficiently separate from the first card substrate 101, the conductor exposed portions 201 are insulated from the first card substrate 101.

An insulating film formed from an insulating coating material having electrical insulation properties, or an oxide film may be further provided on the outer peripheral recess portions 53.

In the present embodiment, the clearance C between the outer peripheral surface 21f of the contact terminal 21 or the outer peripheral surface 22f of the fingerprint sensor 22 and the aperture inner peripheral surface 105f of the aperture 105 is set at, for example, approximately 0.1 mm. In this case, a clearance X between the outer peripheral recess portion 53 and the aperture inner peripheral surface 105f of the aperture 105 may be set at, for example, approximately 0.15 mm to 0.25 mm.

As illustrated in FIG. 3, the electronic component 20D includes outer peripheral insulating portions 207. The outer peripheral insulating portions 207 are formed at portions of the outer peripheral surface 21f, 22f of the electronic component body 205 other than the outer peripheral recess portions 53. The outer peripheral insulating portions 207 are formed at an outer peripheral portion of the electronic component body 205 so as to enclose the plating layer M except the conductor exposed portions 201. The outer peripheral insulating portion 207 is formed from an insulating material having electrical insulation properties. The outer peripheral insulating portions 207 are portions that remain when the substrate 200 of the terminal body 24 and the electrode portion 25 is cut in accordance with the regions 24p and 25p. A predetermined size of the regions 24p and 25p, where the outer peripheral insulating portions 207 are formed, is set larger than sizes of the terminal body 24 and the electrode portion 25 to be formed, in view of machining tolerance or the like so that the plating layer M that forms the terminal body 24 and the electrode portion 25 is not exposed to the outer peripheral surface 21f, 22f.

A method for producing the IC card 1D as described above will be described next.

Figure 5:
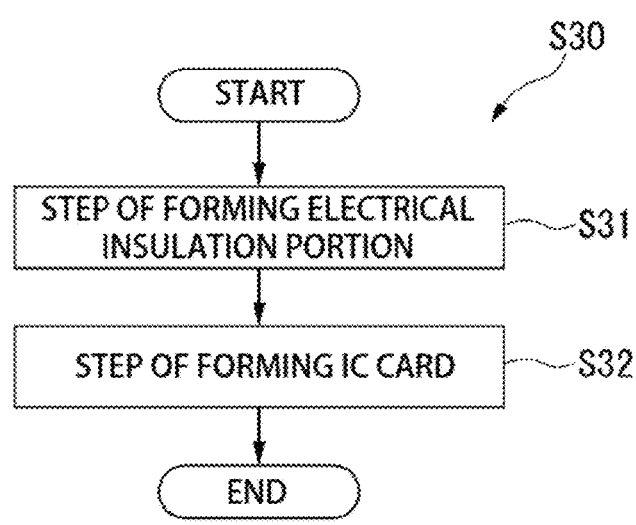
FIG. 5 is a flowchart illustrating a method for producing the IC card.

FIG. 5 is a flowchart illustrating the method for producing the IC card. As illustrated in FIG. 5, a method S30 for producing the IC card 1D includes a step S31 of forming the electrical insulation portions 50D and a step S32 of forming the IC card 1D.

In the step S31 of forming the electrical insulation portion 50D, the outer peripheral recess portion 53 is formed on the outer peripheral surface 21f of the contact terminal 21 or the outer peripheral surface 22f of the fingerprint sensor 22, which is the electronic component 20D. As illustrated in FIG. 4, after the plating layer M is formed by performing a plating process on the conductive pattern 202 formed on the substrate 200, the substrate 200 is cut by press working, laser processing, or the like, in accordance with the region 24p where the terminal body 24 is to be formed or the region 25p where the electrode portion 25 is to be formed including the outer peripheral recess portion 53.

The contact terminal 21 and the fingerprint sensor 22 which are electronic components 20D formed in this manner are mounted on the circuit substrate 40.

Figure 6:
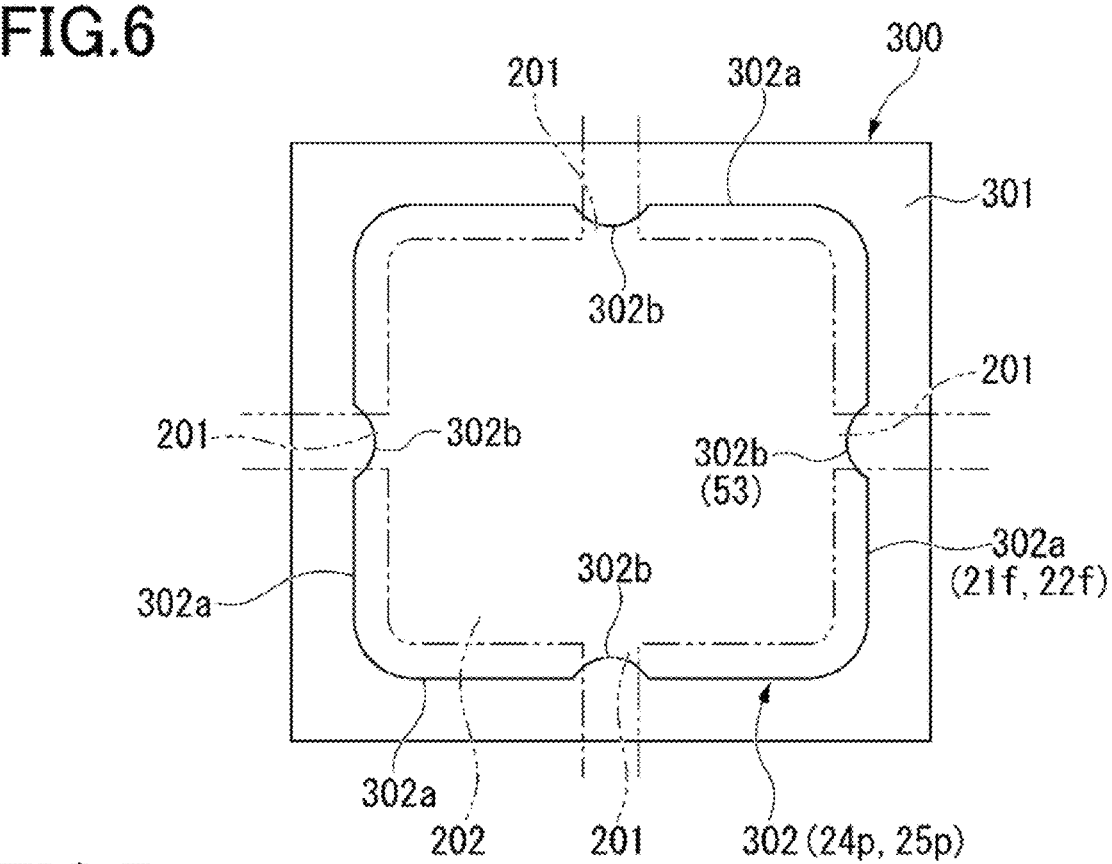
FIG. 6 is a drawing illustrating an example of a die for forming the electronic component.

FIG. 6 is a drawing illustrating an example of a die to be used in the step of forming the electrical insulation portions.

In the case where press working is used to cut the substrate 200, a press working die 300 as illustrated in FIG. 6 is used. The die 300 includes a die body 301 and a cutting blade 302. The die body 301 is loaded to a processing machine for press working. The cutting blade 302 is integrally formed with the die body 301. The cutting blade 302 is formed to fit an external shape of the electronic component 20D having the outer peripheral recess portions 53, that is, the region 24P, 25P where the electronic component body 205 is to be formed. Specifically, the cutting blade 302 includes outer peripheral surface forming portions 302a and projecting portions 302b. The outer peripheral surface forming portions 302a are portions that form the outer peripheral surface 21f, 22f of the electronic component body 205. The projecting portions 302b project inward with respect to the outer peripheral surface forming portions 302a to form the outer peripheral recess portions 53 that are recessed inward in the electronic component body 205 from the outer peripheral surface 21f, 22f.

By cutting the substrate 200 using the die 300 having such a cutting blade 302, the electronic component 20D having an external shape including the outer peripheral recess portions 53 as illustrated in FIG. 3 can be obtained through a single instance of press working.

In the step S32 of forming the IC card 1D, the IC card 1D is assembled by stacking the card substrates 101 and 102 that constitute the card body 10 and the circuit substrate 40 including the electronic component 20D. The circuit substrate 40 is disposed between the first card substrate 101 and the second card substrate 102. In this situation, the electronic component 20D is disposed in the aperture 105 of the first card substrate 101. Then, the first card substrate 101 is joined to the second card substrate 102 through thermoforming or the like. As a result, the IC card 1D is obtained.

The IC card 1D according to the present embodiment includes the electrical insulation portions 50D between the electronic component 20D and the aperture inner peripheral surface 105f. In each electrical insulation portion 50D, the outer peripheral recess portion 53 is formed at a portion of the outer peripheral surface 21f, 22f of the electronic component 20D so as to include a portion where the conductor exposed portion 201 is formed. The outer peripheral recess portion 53 is recessed in a direction away from the aperture inner peripheral surface 105f. The outer peripheral recess portions 53 secure a large clearance from the aperture inner peripheral surface 105f at respective portions of the outer peripheral surface 21f, 22f of the electronic component 20D where the conductor exposed portion 201 is formed. It is therefore possible to prevent an electrical short circuit between the first card substrate 101 of the card body 10 containing a metal material and the electronic components 20D disposed inside the respective apertures 105 formed in the card body 10.

Modification of First Embodiment

Although in the first embodiment, an example has been described where, when the electronic component 20D is formed through press working in step S31, the die 300 including the projecting portions 302b for forming the outer peripheral recess portions 53 is used, a method for forming the electrical insulation portions 50D is not limited to this.

Figure 7:
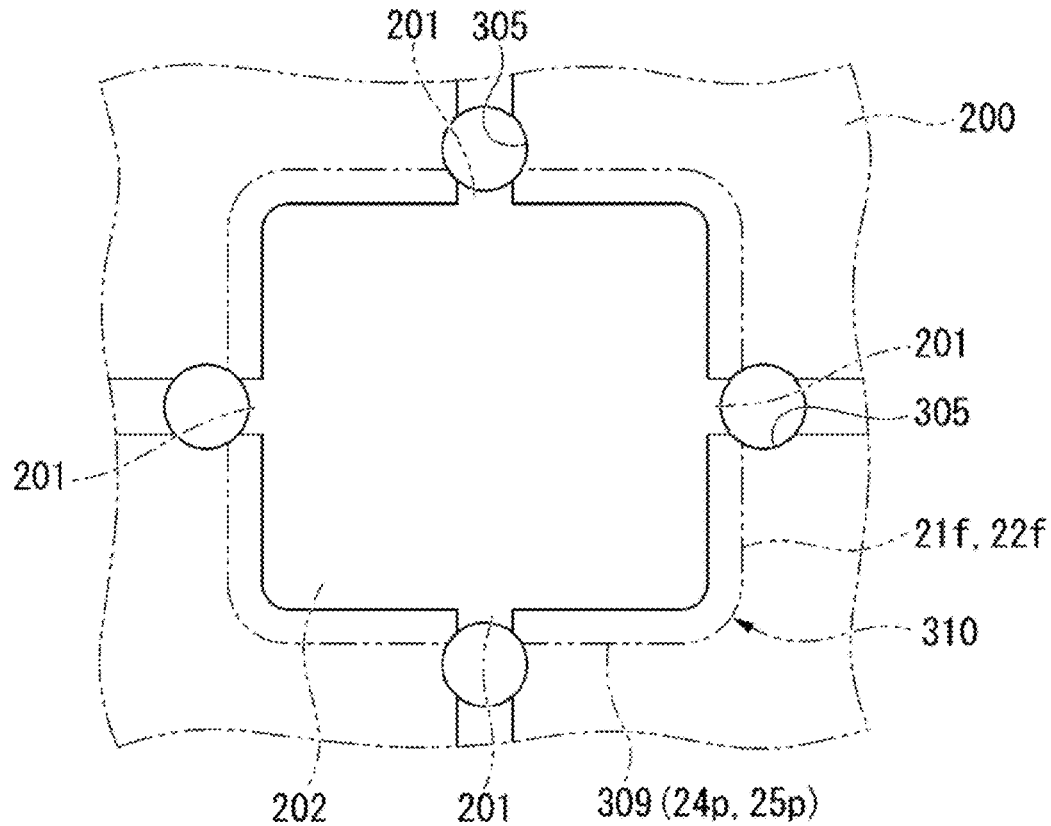
FIG. 7 is a drawing illustrating a modification of another method for forming an outer peripheral recess portion.

For example, as illustrated in FIG. 7, first, a circular hole 305 may be formed at portions of the substrate 200 where the outer peripheral recess portion 53 is to be formed, by press working, laser processing, or the like. As the hole 305, it is preferable to form a hole having a diameter greate than a diameter with a machining tolerance in a die 310 which will be described later.

After the holes 305 are formed, the substrate 200 is cut using the die 310 including the cutting blade 309 not having the projecting portion 302b. Thus, the electronic component 20D having an external shape including the outer peripheral recess portions 53 as illustrated in FIG. 3 is formed.

With such a configuration, the cutting blade 309 of the die 310 is prevented from having a complicated shape, so that it is possible to reduce manufacturing cost of the die 310.

First Modification of First Embodiment

Figure 8:
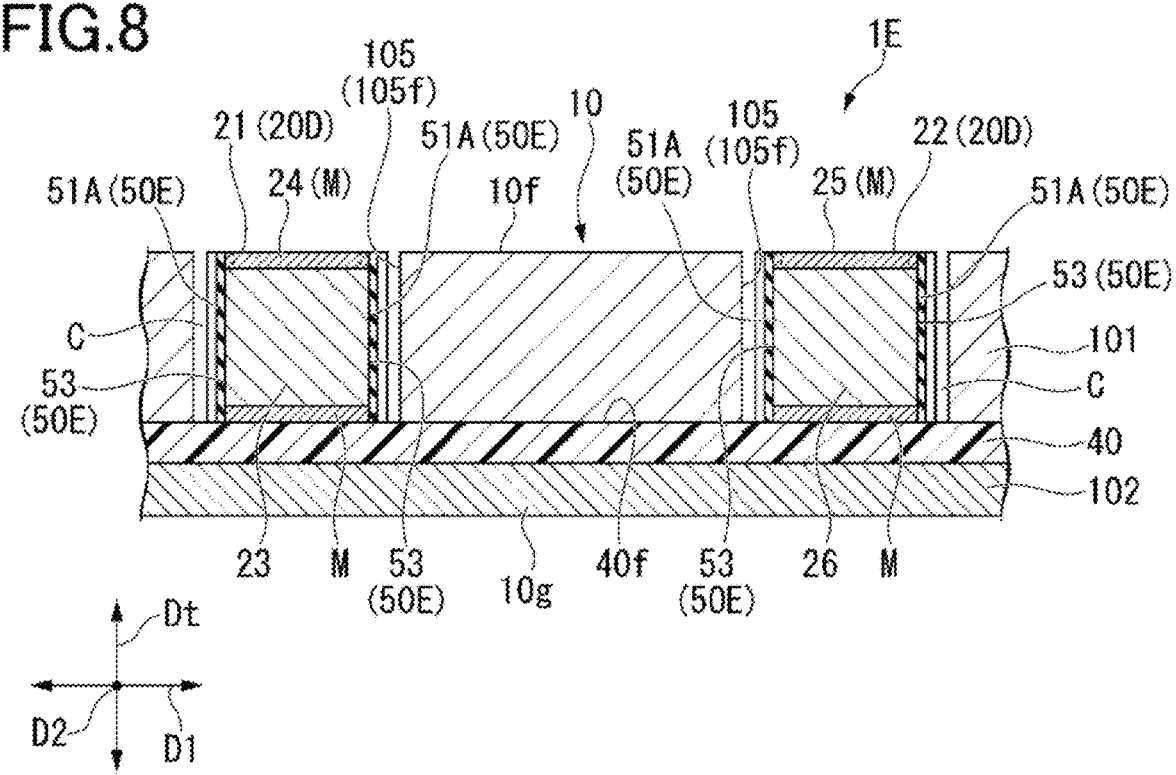
FIG. 8 is a cross-sectional view illustrating electronic components in a first modification of the first embodiment.

FIG. 8 is a cross-sectional view illustrating electronic components in which an insulating film is formed as the electrical insulation portion in another modification of the first embodiment. As illustrated in FIG. 8, an IC card (card medium) 1E may include the outer peripheral recess portions 53 and the insulating film 51A as the electrical insulation portions 50E provided between the electronic components 20D and the respective aperture inner peripheral surfaces 105f.

The insulating film 51A is formed on at least part of the outer surface of the contact terminal 21 or the fingerprint sensor 22 including the conductor exposed portions 201. The insulating film 51A is formed to cover at least the outer peripheral surface 21f of the contact terminal 21 and the outer peripheral surface 22f of the fingerprint sensor 22. In the present modification, the insulating film 51A is formed to cover only the outer peripheral surface 21f of the contact terminal 21 and the outer peripheral surface 22f of the fingerprint sensor 22.

The insulating film 51A is formed from an insulating coating material having electrical insulation properties. The insulating film 51A is made of a coating film of an insulating coating material formed on the outer peripheral surface 21f of the contact terminal 21 or the outer peripheral surface 22f of the fingerprint sensor 22. Examples of the insulating coating material that forms the insulating film 51A include, for example, a solvent containing an epoxy resin, a urethane resin, an acrylic resin, or a silicone resin as a component, a fluorine-based non-flammable solvent, and the like. In particular, when a fluorine-based non-flammable solvent is used as an insulating coating material, an insulating film 51A that excels in physical durability, chemical resistance, and insulation properties is formed.

In the present embodiment, the clearance C between the outer peripheral surfaces 21f and 22f of the contact terminal 21 and the fingerprint sensor 22, and the respective aperture inner peripheral surfaces 105f of the apertures 105 is set at, for example, approximately 0.1 mm. In this case, the thickness of the insulating film 51A is preferably set at approximately 5 μm to 100 μm.

The conductor exposed portion 201 on the outer peripheral surface 21f, 22f of the electronic components 20D is covered with the insulating film 51A. It is therefore possible to effectively prevent an electrical short circuit between the first card substrate 101 of the card body 10 containing a metal material and the electronic components 20D disposed inside the respective apertures 105 formed in the card body 10.

Second Modification of First Embodiment

Figure 9:
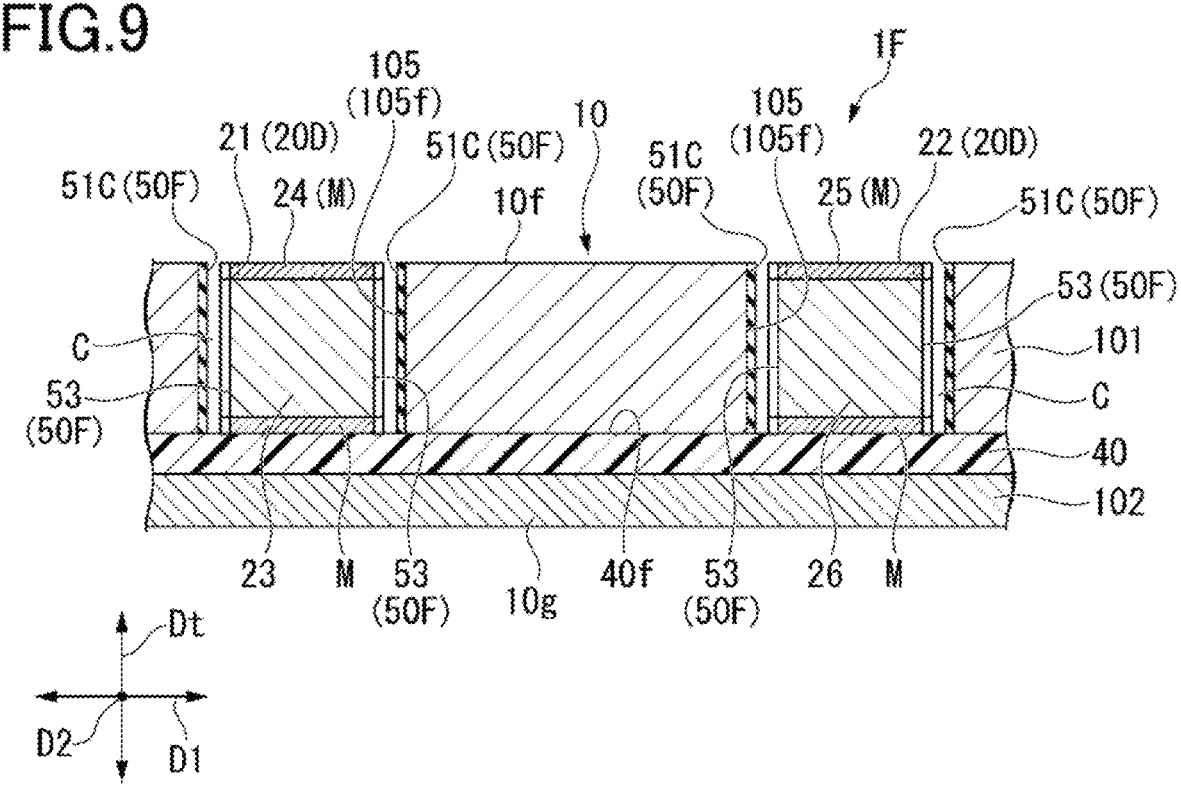
FIG. 9 is a cross-sectional view illustrating a card body of a second modification of the first embodiment.

FIG. 9 is a cross-sectional view illustrating a card body in which an insulating film is formed as the electrical insulation portion in another modification of the first embodiment. As illustrated in FIG. 9, an IC card (card medium) 1F may include the outer peripheral recess portions 53 and the insulating film 51C as electrical insulation portions 50F provided between the electronic components 20D and the respective aperture inner peripheral surfaces 105f.

The insulating film 51C is formed on at least part of the outer surface of the card body 10 including the aperture inner peripheral surface 105f. The insulating film 51C is formed on at least the aperture inner peripheral surface 105f of the first card substrate 101. In the present modification, the insulating film 51C is formed to cover only the aperture inner peripheral surface 105f.

The insulating film 51C can be formed from, for example, an insulating coating material having electrical insulation properties. The insulating film 51C is a coating film of an insulating coating material formed by being applied to the aperture inner peripheral surface 105f. As the insulating coating material that forms the insulating film 51C, a material corresponding to that of the insulating film 51A in the above modification can be employed. In the case where the insulating film 51C is formed from the insulating coating material, the thickness of the insulating film 51C is preferably set at approximately 5 μm to 100 μm.

As the insulating film 51C, an oxide film formed on a metal surface that forms the aperture inner peripheral surface 105f can also be employed. In other words, the insulating film 51C may be formed of a metallic oxide. Such an oxide film has insulation properties and has higher physical durability such as abrasion resistance and chemical resistance than resin coating and the like. An oxide film is dense and extremely thin. Thus, the effects of changes in size of portions due to formation of the insulating film 51C can be suppressed. In the case where the insulating film 51C is formed of an oxide film, the thickness of the insulating film 51C is preferably set at approximately 5 μm to 20 μm.

The insulating film 51C prevents the conductor exposed portion 201 on the outer peripheral surface 21f, 22f of the electronic component 20D from directly coming into contact with the first card substrate 101. It is therefore possible to more effectively prevent an electrical short circuit between the card body 10 containing a metal material and the electronic components 20D disposed inside the respective aperture 105 formed in the card body 10.

Second Embodiment

An IC card according to a second embodiment will be described below with reference to FIGS. 10 to 14.

Figure 10:
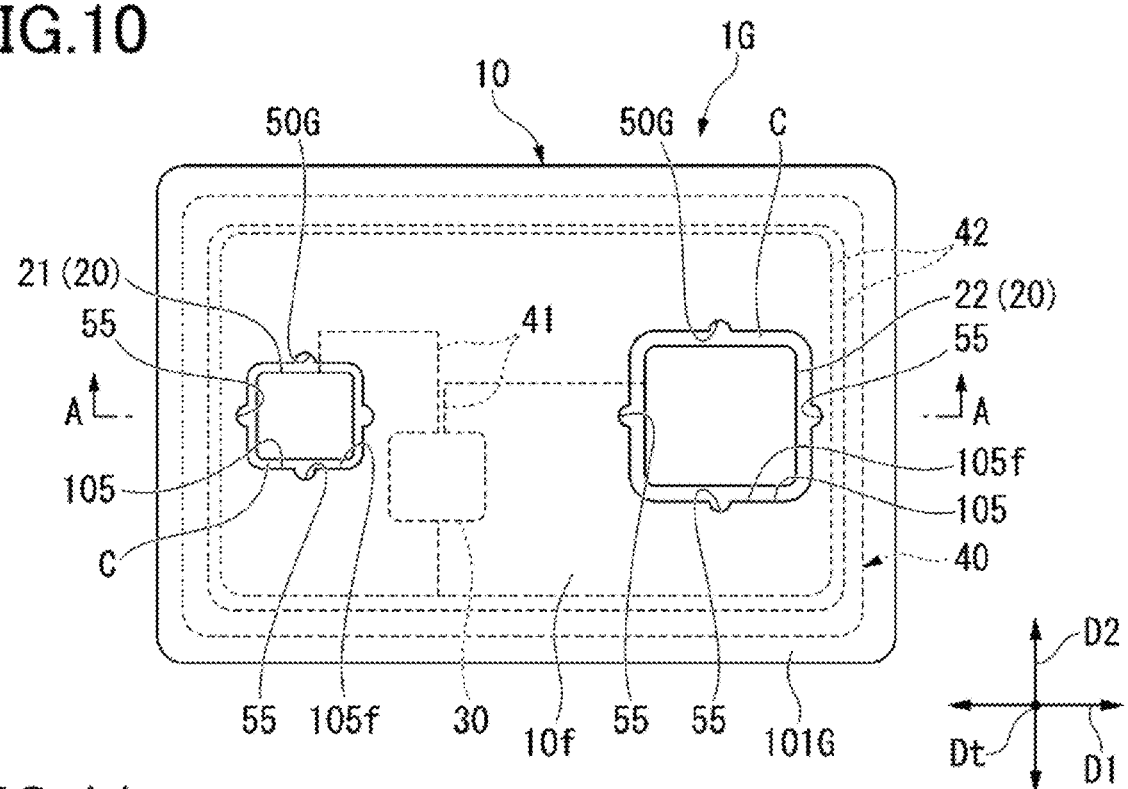
FIG. 10 is a view of the external appearance of an IC card according to a second embodiment of the present invention, viewed from its front side.
Figure 11:
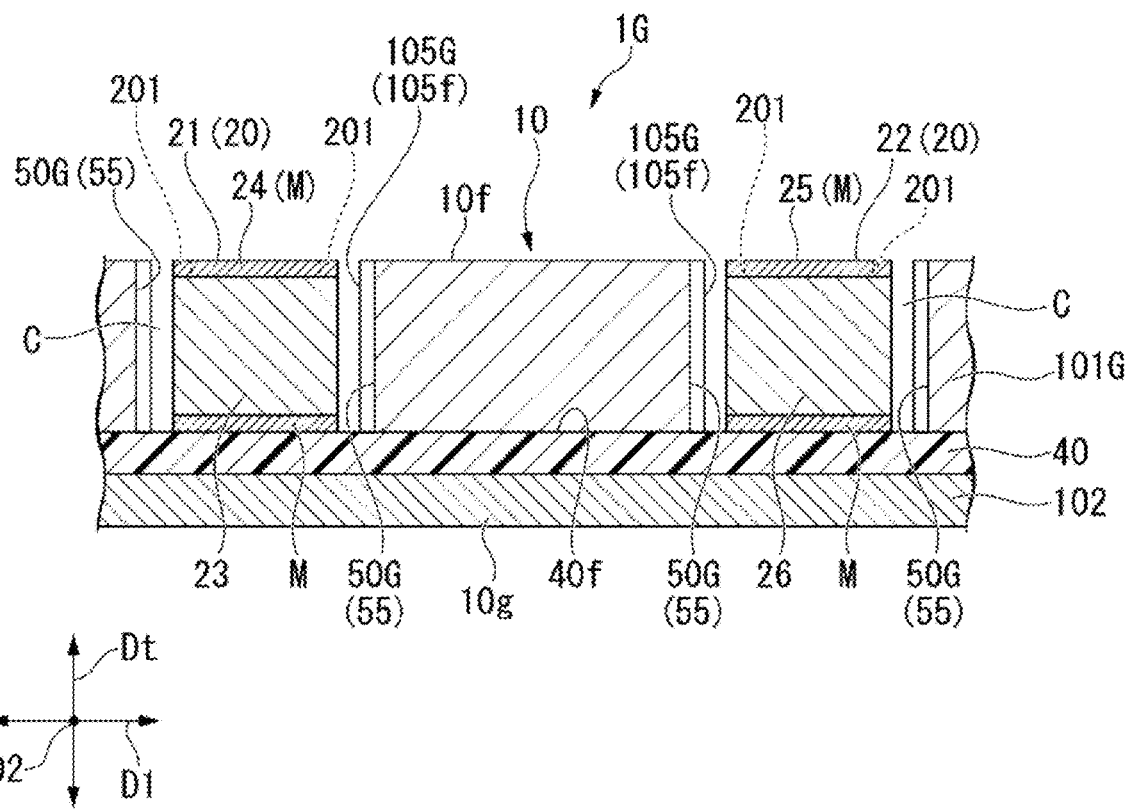
FIG. 11 is a cross-sectional view taken along line A-A in FIG. 10.

FIG. 10 is a view of the external appearance of an IC card 1G according to the second embodiment of the present invention, viewed from its front side. FIG. 11 is a cross-sectional view taken along line 10A-A.

As illustrated in FIG. 10, the IC card (card medium) 1G mainly includes the card body 10, the electronic components 20, and the circuit substrate 40. The IC card 1G is a dual interface IC card including the contact terminal 21 and the antenna 42. The contact terminal 21 is a contact type interface. The antenna 42 is a contactless type interface. The IC card 1G has a biometric authentication function using the fingerprint sensor 22. The fingerprint sensor 22 is an example of the electronic component 22. The card body 10 corresponds to that in the first embodiment.

As illustrated in FIG. 11, the card body 10 is composed of a plurality of sheet-like card substrates 101 and 102 stacked in the card thickness direction Dt. The card substrates 101 and 102 are substrates for the card medium. The first card substrate 101 is an example of a metal card substrate. The first card substrate 101 and the second card substrate 102 correspond to those in the first embodiment.

Inner peripheral recess portions 55 are formed in the aperture 105. The inner peripheral recess portions 55 are formed on the aperture inner peripheral surface 105*f* of the aperture 105. The inner peripheral recess portions 55 are recessed in a direction away from the center of the aperture 105 when viewed in the card thickness direction Dt. The inner peripheral recess portions 55 are recessed in a direction away from the respective conductor exposed portions 201. The inner peripheral recess portion 55 is formed in a semicircular shape when viewed in the card thickness direction Dt. The shape of the inner peripheral recess portion 55 when viewed in the card thickness direction Dt is not limited to a semicircular shape, and, for example, may be other shapes such as a rectangular shape as appropriate. The inner peripheral recess portions 55 are each formed on the aperture inner peripheral surface 105*f* so as to include a portion that faces the conductor exposed portion 201 with the clearance C provided from the conductor exposed portion 201. The inner peripheral recess portions 55 are each formed at a position including a portion that faces a position at which the conductor exposed portion 201 is disposed. In other words, the inner peripheral recess portions 55 are formed at only parts of the aperture inner peripheral surface 105*f* in a circumferential direction.

The inner peripheral recess portion 55 is formed in the card thickness direction Dt of the first card substrate 101. The inner peripheral recess portion 55 is formed to extend through the entire thickness of the first card substrate 101 in the card thickness direction Dt. In the card thickness direction Dt of the card body, the inner peripheral recess portion 55 is continuously formed from the front surface of the first card substrate 101 to the circuit substrate 40. In other words, the inner peripheral recess portion 55 penetrates through the first card substrate 101 in the card thickness direction Dt.

The second card substrate 102 is disposed at the rear surface 10*g* of the card body 10. The second card substrate 102 corresponds to that in the first embodiment.

The electronic component 20D is arranged to have a part thereof exposed at the front surface 10*f* of the card body 10.

In the present embodiment, the IC card 1G may include, for example, the contact terminal 21 and the fingerprint sensor 22 as the electronic components 20. The contact terminal 21 and the fingerprint sensor 22 are respectively disposed in the apertures 105 formed in the card body 10.

The contact terminal 21 is formed in a rectangular shape when viewed in the card thickness direction Dt. The contact terminal 21 includes the substrate 23 and the terminal body 24. The substrate 23 and the terminal body 24 correspond to those in the first embodiment.

The fingerprint sensor 22 is formed in a rectangular plate shape when viewed in the card thickness direction Dt. The fingerprint sensor 22 has the electrode portion 25 and the substrate 26. The electrode portion 25 and the substrate 26 correspond to those in the first embodiment.

As illustrated in FIG. 10, the IC chip 30 is embedded into the card body 10. The IC chip 30 is electrically coupled to the contact terminal 21, the fingerprint sensor 22, and the antenna 42 via the wiring pattern 41 formed on the circuit substrate 40. The IC chip 30 corresponds to that in the first embodiment.

The IC chip 30 is formed in a rectangular shape when viewed in the card thickness direction Dt.

The circuit substrate 40 is embedded into the card body 10 by being disposed between the first card substrate 101 and the second card substrate 102. The circuit substrate 40 is disposed inside an outer edge of the card body 10 when viewed in the card thickness direction Dt. The circuit substrate 40 has a rectangular external shape when viewed in the card thickness direction Dt. The thickness of the circuit substrate 40 in the card thickness direction Dt may be, for example, 15 μm to 50 μm.

The circuit substrate 40 is formed of a flexible circuit substrate. The circuit substrate 40 corresponds to that in the first embodiment.

As illustrated in FIG. 11, the circuit substrate 40 is disposed closer to the rear surface 10*g* of the card body 10 in the card thickness direction Dt than the contact terminal 21, fingerprint sensor 22, and IC chip 30 are. The contact terminal 21, the fingerprint sensor 22, and the IC chip 30 are mounted on a substrate surface 40*f* (mounting surface) that faces in the same direction as the surface 10*f* of the card body 10.

The wiring pattern 41 is formed on the surface of the circuit substrate 40 through etching. The wiring pattern 41 corresponds to that in the first embodiment. The wiring pattern 41 electrically couples (connects) the contact terminal 21, the fingerprint sensor 22, and the antenna 42, with the IC chip 30.

The antenna 42 is provided on the circuit substrate 40. The antenna 42 corresponds to that in the first embodiment.

Figure 12:
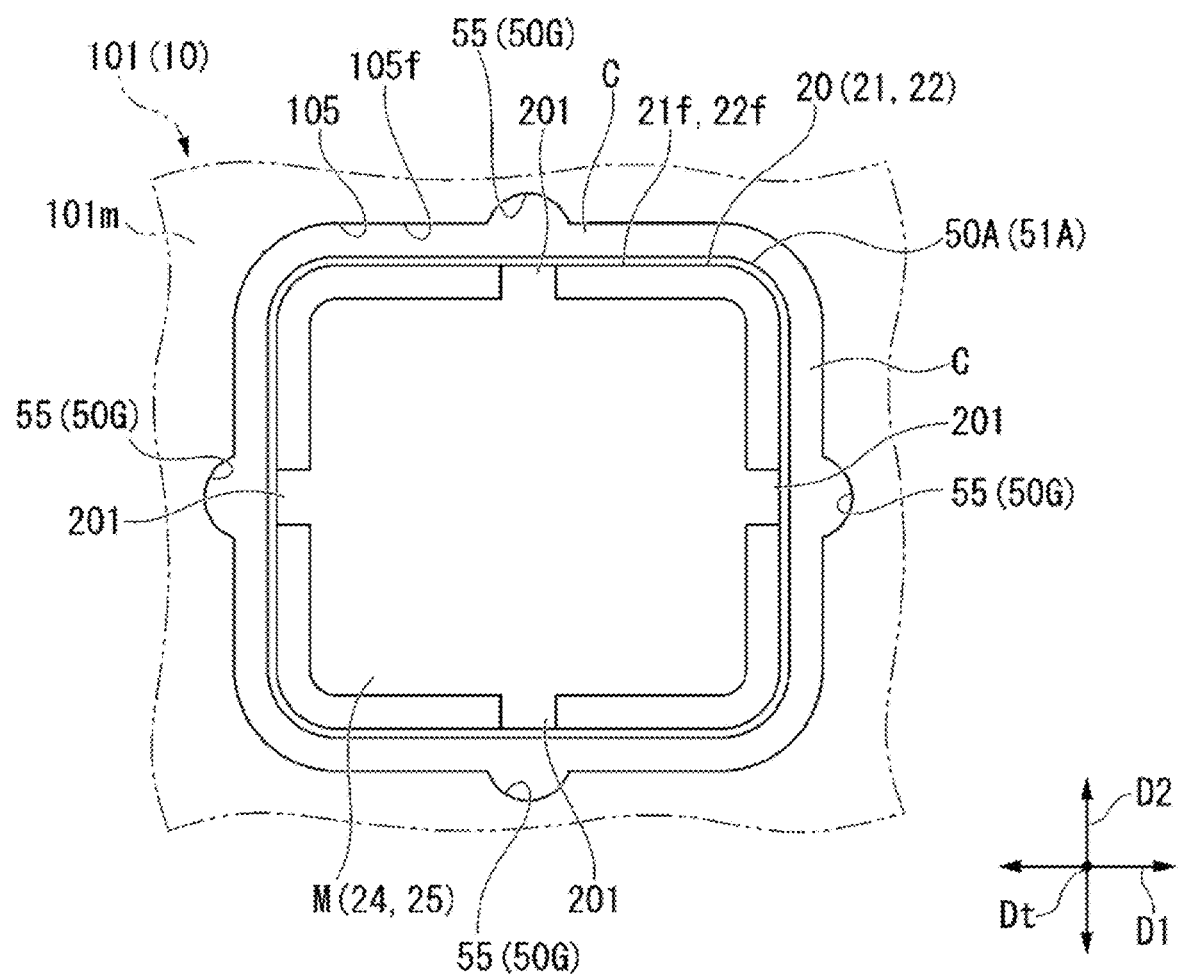
FIG. 12 is a plan view illustrating an electronic component contained in an aperture of a card body.

FIG. 12 is a plan view illustrating an aperture of the card body in which the electronic component is disposed. The contact terminal 21 and the fingerprint sensor 22 are arranged in the respective apertures 105 in the same manner; thus, FIG. 12 illustrates a case where the electronic component is the contact terminal 21 and a case where the electronic component is the fingerprint sensor 22 in one drawing.

Each of the contact terminal 21 and the fingerprint sensor 22, which are the electronic components 20, is disposed with the clearance C provided from the aperture inner peripheral surface 105*f* of the aperture 105. As illustrated in FIG. 12, the contact terminal 21 and the fingerprint sensor 22 respectively have outer peripheral surfaces 21*f* and 22*f* similar to those in the first embodiment. The conductor exposed portions 201 are formed on parts of the outer peripheral surface 21*f* of the contact terminal 21 and parts of the outer peripheral surface 22*f* of the fingerprint sensor 22.

The conductor exposed portion 201 is made of a conductor having conductive properties in the contact terminal 21. The conductor exposed portion 201 is produced when the terminal body 24 made of the plating layer M is formed by a plating process.

Figure 13:
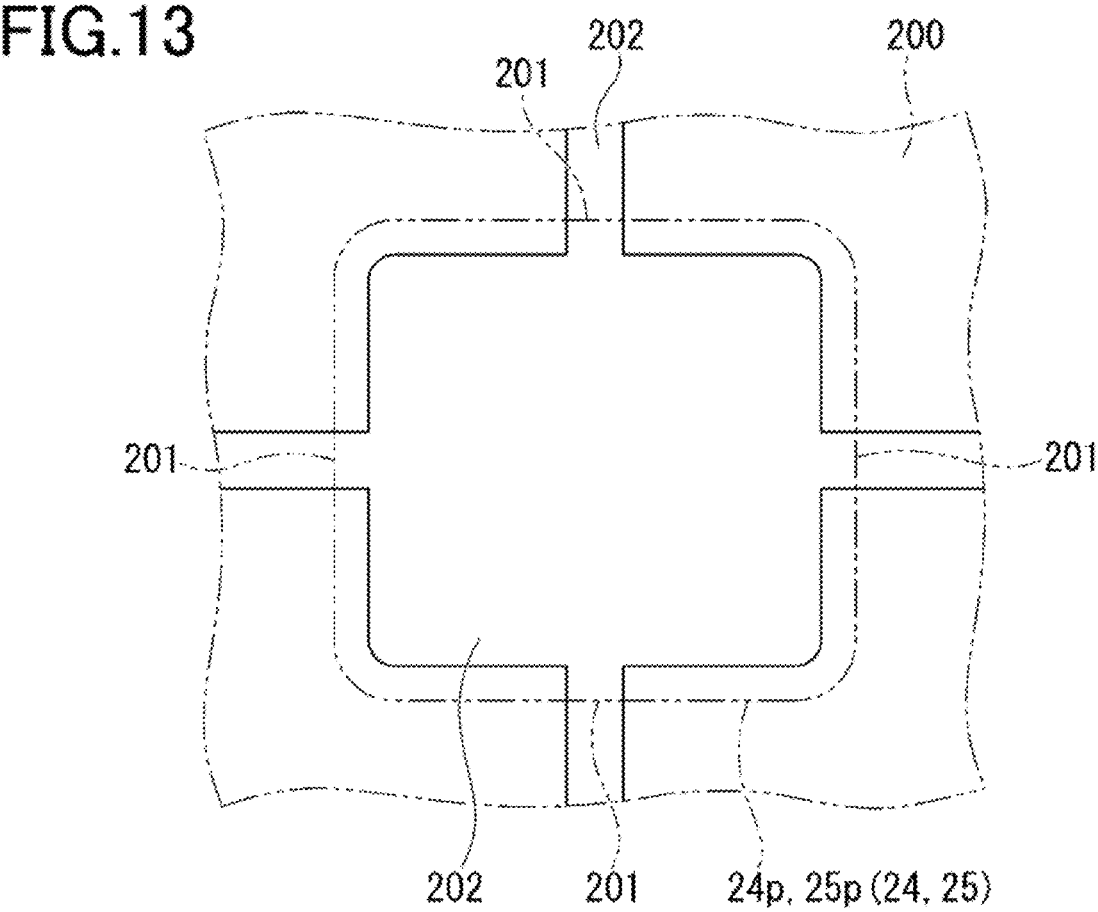
FIG. 13 is a plan view illustrating a wiring portion formed for performing a plating process when the electronic component is formed.

FIG. 13 is a plan view illustrating a conductive pattern formed on the substrate 200 of the electrode portion 25. The conductive pattern is formed for performing a plating process when forming the exposed component. The method for forming the conductive pattern corresponds to that in the first embodiment.

As illustrated in FIG. 11 and FIG. 12, the IC card 1G includes electrical insulation portions 50G between the contact terminal 21 and the fingerprint sensor 22, which are the electronic components 20, and the respective aperture inner peripheral surfaces 105*f* to achieve electrical insulation between the electronic components 20 and the respective aperture inner peripheral surfaces 105*f*. The electrical insulation portions 50G electrically insulate the electronic components 20 from the respective aperture inner peripheral surfaces 105*f*. In the present embodiment, the inner peripheral recess portion 55 constitutes the electrical insulation portion. In other words, by the inner peripheral recess portions 55 being formed to be recessed so as to be sufficiently separate from the respective conductor exposed portions 201, a large clearance Y between the conductor exposed portions 201 on the outer peripheral surface 21*f*, 22*f* of the electronic component 20 and the first card substrate 101 can be secured by the inner peripheral recess portions 55. This results in making it possible to insulate the conductor exposed portions 201 from the first card substrate 101.

An insulating film formed from an insulating coating material or the like having electrical insulation properties, or an oxide film may be further provided on the inner peripheral recess portions 55.

In the present embodiment, the clearance C between the aperture inner peripheral surface 105*f* of the aperture 105 and the outer peripheral surface 21*f* of the contact terminal 21 or the outer peripheral surface 22*f* of the fingerprint sensor 22 is set at, for example, approximately 0.1 mm. In this case, the clearance Y between the inner peripheral recess portions 55 and the respective conductor exposed portions 201 may be set at, for example, approximately 0.15 mm to 0.25 mm.

A method for producing the IC card 1G as described above will be described next.

Figure 14:
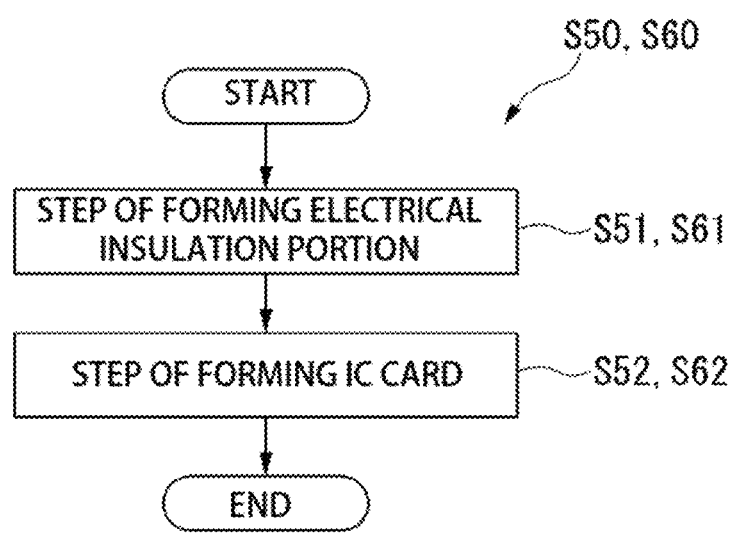
FIG. 14 is a flowchart illustrating a method for producing the IC card.

FIG. 14 is a flowchart illustrating the method for producing the IC card. As illustrated in FIG. 14, a method S50 for producing the IC card 1G includes a step S51 of forming the electrical insulation portion 50G and a step S52 of forming the IC card 1G.

In the step S51 of forming the electrical insulation portion 50G, in the present embodiment, the aperture 105 and the inner peripheral recess portions 55 are formed in the first card substrate 101. The aperture 105 and the inner peripheral recess portions 55 are formed in a predetermined shape by performing laser processing or cutting on the first card substrate 101. As a result, the first card substrate 101 including the aperture 105 having the inner peripheral recess portions 55 is formed.

The electronic components 20 produced in advance are mounted on the circuit substrate 40.

In the step S52 of forming the IC card 1G, the IC card 1G is assembled by stacking the card substrates 101 and 102, which constitute the card body 10, and the circuit substrate 40 including the electronic components 20. The circuit substrate 40 is disposed between the first card substrate 101 and the second card substrate 102. In this situation, the electronic components 20 are disposed in the respective apertures 105 of the first card substrate 101. Then, the first card substrate 101 is joined to the second card substrate 102 by thermoforming or the like. As a result, the IC card 1G is obtained.

The IC card 1G of the present embodiment includes the electrical insulation portions 50G between each electronic component 20 and the first card substrate 101. The electrical insulation portions 50G electrically insulate the electronic component 20 from the card substrate 101. Specifically, the inner peripheral recess portion 55 recessed in a direction away from the conductor exposed portion 201 is formed on the aperture inner peripheral surface 105*f* as the electrical insulation portion 50G. The inner peripheral recess portions 55 each secure a large clearance Y between the conductor exposed portion 201 of the outer peripheral surface 21*f*, 22*f* of the electronic component 20 and the inner peripheral recess portion 55. It is therefore possible to prevent an electrical short circuit between the first card substrate 101 of the card body 10 containing a metal material and the electronic components 20 disposed inside the respective apertures 105.

The inner peripheral recess portions 55 are each formed to extend in the card thickness direction Dt of the card body 10 through the entire thickness of the first card substrate 101 on a side of the circuit substrate 40 on which the electronic components 20 are disposed. The inner peripheral recess portions 55 can be formed at the same time as the aperture 105 when the aperture 105 is formed by laser processing or cutting. It is therefore possible to efficiently form the inner peripheral recess portions 55.

Third Embodiment

A third embodiment according to the card medium will be described with reference to the drawings. In the following description, the same reference characters are assigned to components in common with components already described, and redundant description is omitted. The following embodiment is different from the second embodiment in an electrical insulation portion 50H. In the following description, the same reference characters are assigned to components corresponding to the components of the card medium in the above-described embodiments, and redundant description is omitted.

Figure 15:
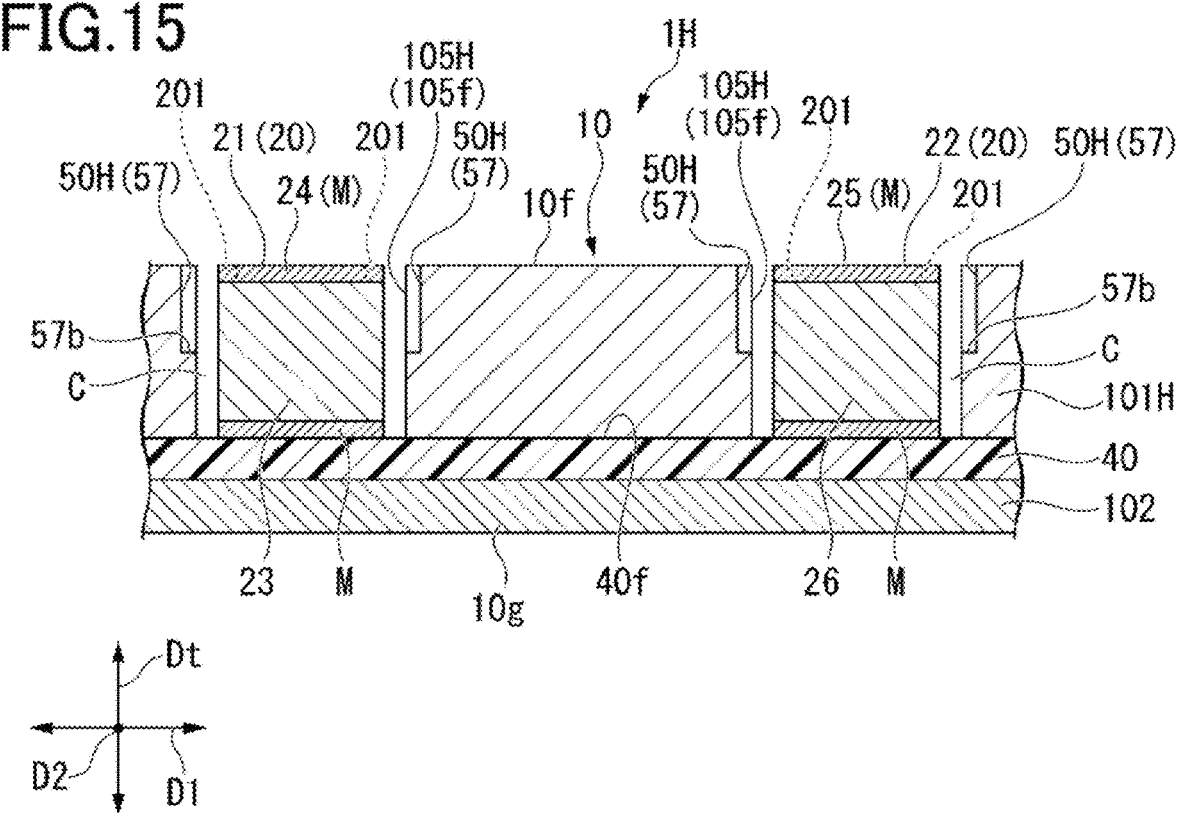
FIG. 15 is a cross-sectional view illustrating an IC card according to a third embodiment.

FIG. 15 is a cross-sectional view illustrating an IC card 1H according to the third embodiment.

The IC card 1H includes the electrical insulation portions 50H. The electrical insulation portions 50H achieve electrical insulation between the contact terminal 21 and the fingerprint sensor 22, which are the electronic components 20, and the respective aperture inner peripheral surfaces 105*f*. The electrical insulation portion 50H is the inner peripheral recess portion 57.

Figure 16:
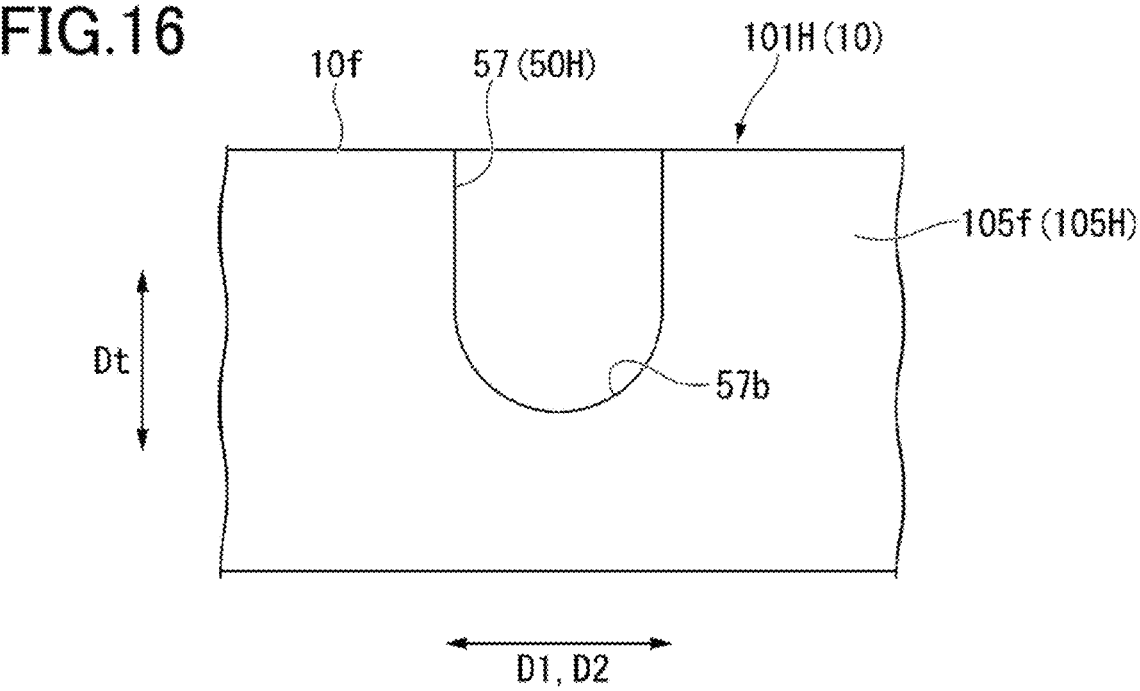
FIG. 16 is a schematic diagram of an inner peripheral recess portion in FIG. 15, as viewed from inside an aperture.
Figure 17:
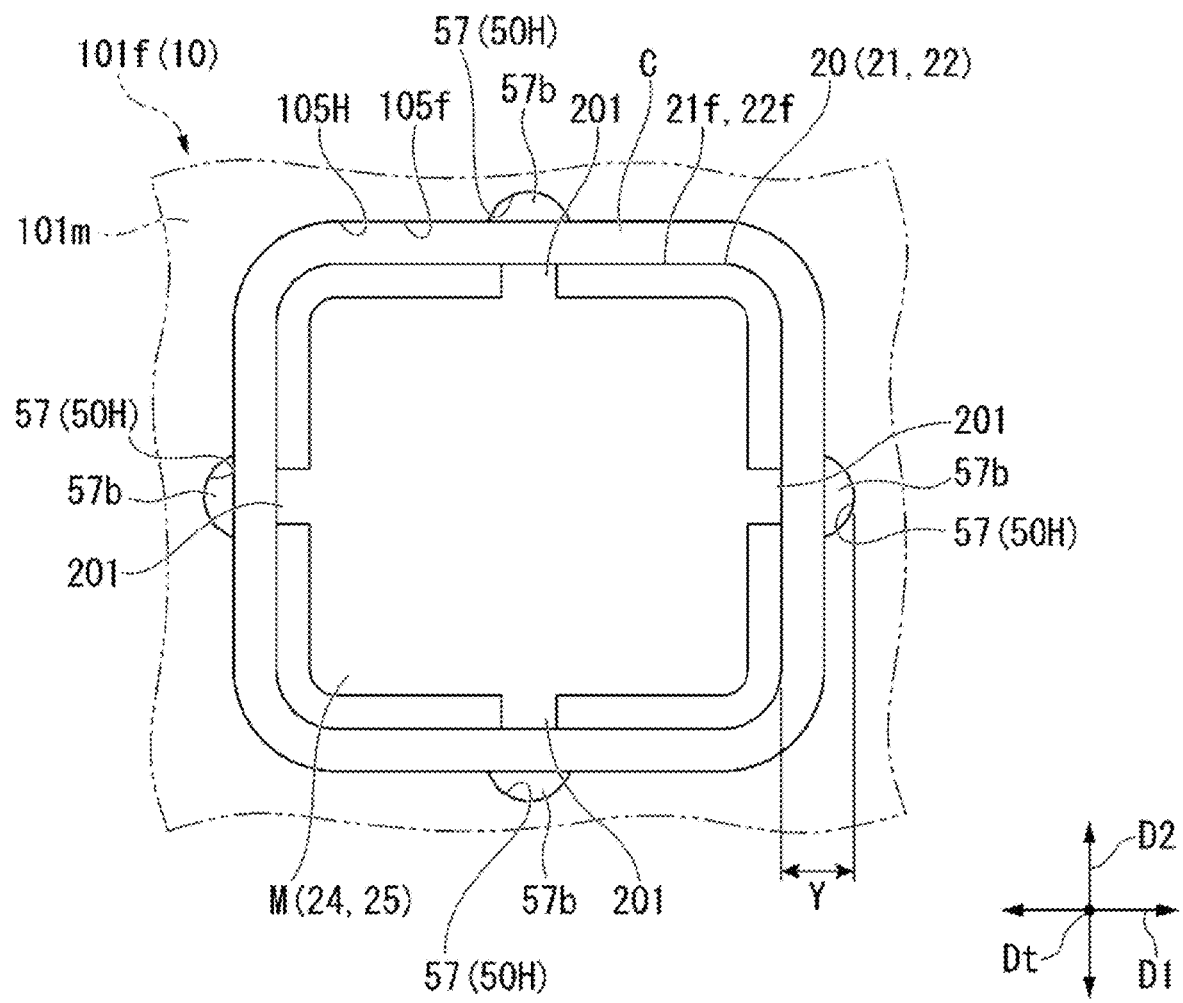
FIG. 17 is a plan view illustrating an aperture of a card body in which an electronic component is disposed in the third embodiment.

FIG. 16 is a diagram of the inner peripheral recess portion as the electrical insulation portion formed on the aperture inner peripheral surface of an aperture, when viewed from inside the aperture. FIG. 17 is a plan view illustrating the aperture of the card body in which the electronic component is disposed.

As illustrated in FIGS. 15 to 17, the inner peripheral recess portions 57 are formed on the aperture inner peripheral surface 105*f* of the aperture 105H formed in the first card substrate 101H of the card body 10. The inner peripheral recess portions 57 are recessed in a direction away from the center of the aperture 105 when viewed in the card thickness direction Dt. The inner peripheral recess portions 57 are recessed in a direction away from the respective conductor exposed portions 201. The inner peripheral recess portion 57 is formed in a semicircular shape when viewed in the card thickness direction Dt. The shape of the inner peripheral recess portion 57 when viewed in the card thickness direction Dt is not limited to a semicircular shape, and may be, for example, other shapes such as a rectangular shape as appropriate. The inner peripheral recess portions 57 are each formed on the aperture inner peripheral surface 105$f$ so as to include a portion (facing portion) that faces the conductor exposed portion 201 with the clearance C provided from the conductor exposed portion 201. Each inner peripheral recess portion 57 is formed at a position including a portion that faces a position at which the conductor exposed portion 201 is disposed. In other words, the inner peripheral recess portions 57 are formed at only parts of the aperture inner peripheral surface 105$f$ in a circumferential direction.

The inner peripheral recess portions 57 are formed in the card thickness direction Dt of the first card substrate 101H. Each inner peripheral recess portion 57 is formed from the front surface 10$f$ of the first card substrate 101H to only part thereof in the card thickness direction Dt of the card body 10. In other words, the inner peripheral recess portion 57 does not penetrate through the first card substrate 101H in the card thickness direction Dt and is formed to a predetermined depth from the front surface 10$f$. The depth of the inner peripheral recess portion 57 is smaller than the thickness of the first card substrate 101H. The inner peripheral recess portion 57 has a recess portion bottom surface 57$b$.

A method for producing the IC card 1H will be described next.

As illustrated in FIG. 14, a method S60 for producing the IC card 1H includes a step S61 of forming the electrical insulation portion 50H and a step S62 of forming the IC card 1H.

In the step S61 of forming the electrical insulation portion 50H, in the present embodiment, the aperture 105H and the inner peripheral recess portion 57 are formed in the first card substrate 101H. The aperture 105H is formed in the first card substrate 101H in a predetermined shape by laser processing or cutting. The inner peripheral recess portion 57 is formed on the aperture inner peripheral surface 105$f$ of the aperture 105H to a predetermined depth by, for example, router processing or the like. Thus, the recess portion bottom surface 57$b$ of the inner peripheral recess portion 57 corresponds to a tip shape of a processing tool used for forming the inner peripheral recess portion 57. The aperture 105H has a size that allows the electronic component to be disposed therein with a clearance.

The contact terminal 21 and the fingerprint sensor 22 produced in advance are mounted on the circuit substrate 40.

In the step S62 of forming the IC card 1H, the IC card 1H is assembled by stacking the card substrates 101 and 102 and the circuit substrate 40 including the electronic components 20 using a method corresponding to the method in the second embodiment.

In the IC card 1H of the present embodiment, the inner peripheral recess portion 57 recessed in a direction away from the conductor exposed portion 201 is formed on the aperture inner peripheral surface 105$f$ of the card body 10 as the electrical insulation portion 50H in a similar manner to the second embodiment. The inner peripheral recess portions 57 each secure a large clearance Y between the conductor exposed portion 201 of the outer peripheral surface 21$f$, 22$f$ of the electronic component 20 and the inner peripheral recess portion 57. It is therefore possible to prevent an electrical short circuit between the first card substrate 101H of the card body 10 containing a metal material and the electronic components 20 disposed inside the respective aperture 105H.

Each inner peripheral recess portion 55 is formed from the front surface 10$f$ of the first card substrate 101H to only part thereof in the card thickness direction Dt of the card body 10. The inner peripheral recess portion 55 has the recess portion bottom surface 57$b$. Thus, the recess portion bottom surface 57$b$ can be seen inside (at the bottom of) the inner peripheral recess portion 57 when the IC card 1H is viewed from the front surface 10$f$ side in the card thickness direction Dt. The recess portion bottom surface 57$b$ is part of the first card substrate 101H, and thus, is a metal surface. It is therefore possible to provide a dignified appearance and a sense of luxury due to the metal also at each inner peripheral recess portion 55, so that it is possible to improve the texture of the IC card 1H.

First Modification of Third Embodiment

Figure 18:
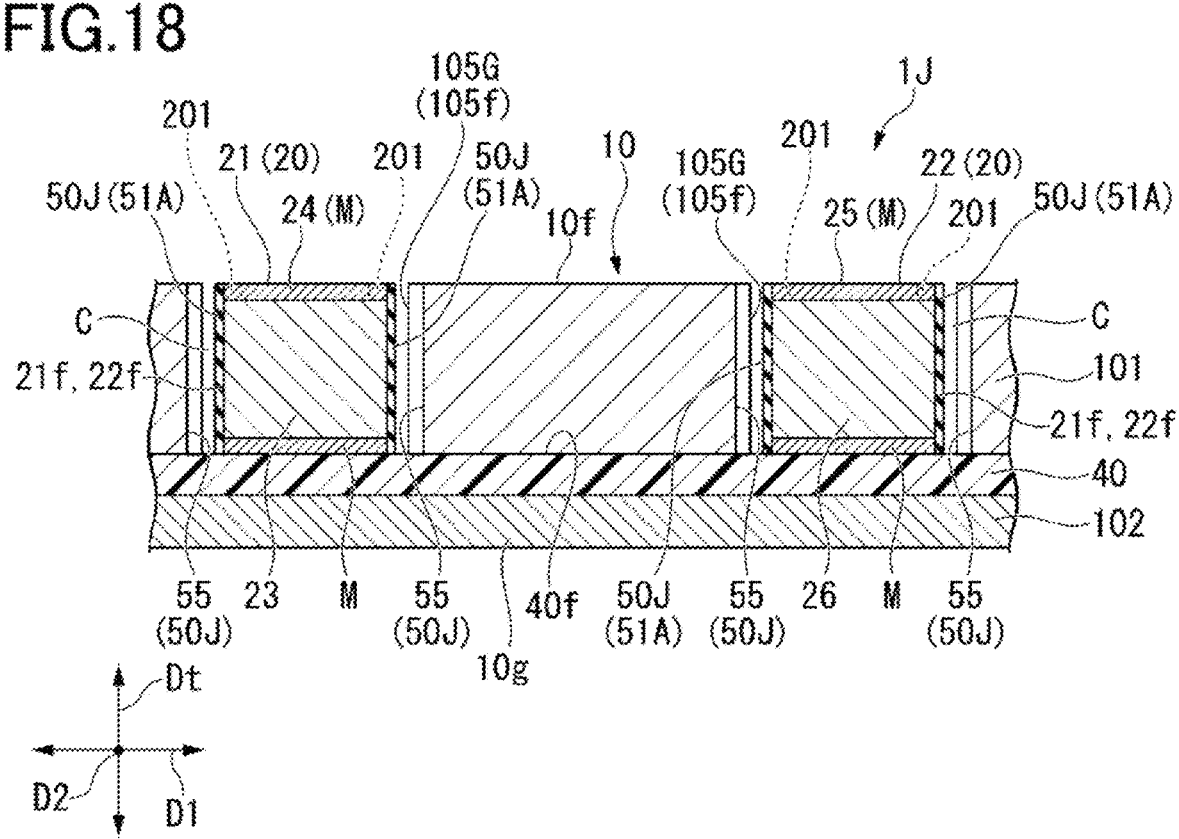
FIG. 18 is a cross-sectional view illustrating electronic components in a modification of the third embodiment.

FIG. 18 is a cross-sectional view illustrating electronic components in a modification of the third embodiment and is a drawing illustrating the electronic components in which an insulating film is formed as the electrical insulation portion. As illustrated in FIG. 18, an IC card (card medium) 1J may include an insulating film 51A in addition to the inner peripheral recess portions 55, as an electrical insulation portion 50J which is formed between the electronic component 20 and the aperture inner peripheral surface 105$f$ and which achieves electrical insulation between the electronic component 20 and the aperture inner peripheral surface 105$f$.

The insulating film 51A is formed on at least part of an outer surface of the electronic component 20 including the conductor exposed portions 201. The insulating film 51A is formed to cover at least the outer peripheral surface 21$f$ of the contact terminal 21 or the outer peripheral surface 22$f$ of the fingerprint sensor 22. In the present modification, the insulating film 51A is formed to cover only the outer peripheral surface 21$f$ of the contact terminal 21 and the outer peripheral surface 22$f$ of the fingerprint sensor 22.

The insulating film 51A is formed of an insulating coating material having electrical insulation properties. The insulating film 51A is formed of a coating film of an insulating coating material formed on the outer peripheral surfaces 21$f$ and 22$f$ of the contact terminal 21 and the fingerprint sensor 22. As the insulating coating material that forms the insulating film 51A, the insulating coating material corresponding to that of the insulating film 51A in the first modification of the first embodiment can be employed.

In the present embodiment, the clearance C between the outer peripheral surfaces 21$f$ and 22$f$ of the contact terminal 21 and the fingerprint sensor 22, and the respective aperture inner peripheral surfaces 105$f$ of the apertures 105 is set at, for example, approximately 0.1 mm. In this case, the thickness of the insulating film 51A is preferably set at approximately 5 μm to 100 μm.

The conductor exposed portions 201 of the outer peripheral surface 21$f$, 22$f$ of the electronic component 20 are covered with such an insulating film 51A. It is therefore possible to more effectively prevent an electrical short circuit between the first card substrate 101 of the card body 10 containing a metal material and the electronic components 20 disposed inside the respective apertures 105 formed in the card body 10.

Second Modification of Third Embodiment

Figure 19:
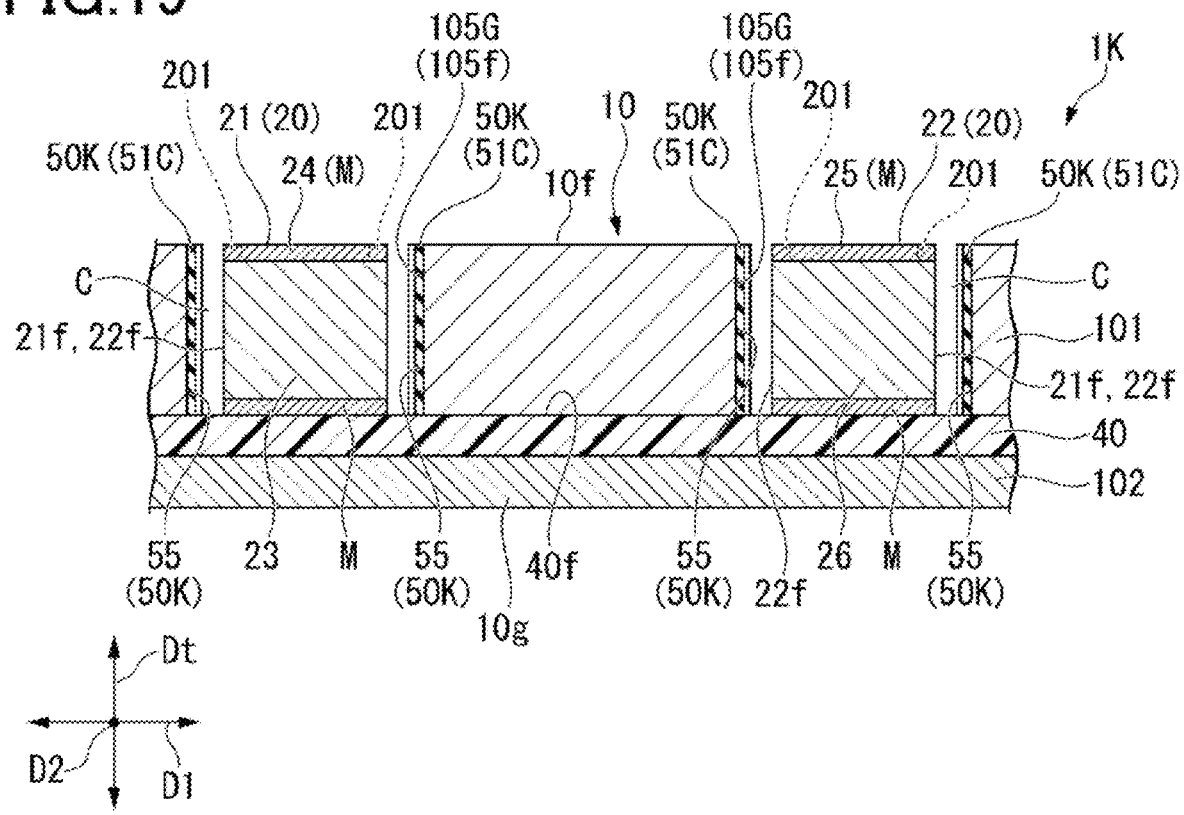
FIG. 19 is a cross-sectional view illustrating a card body in which an insulating film is formed as an electrical insulation portion in another modification of the third embodiment.

As illustrated in FIG. 19, an IC card (card medium) 1K may include an insulating film 51C in addition to the inner peripheral recess portions 55, as an electrical insulation portion 50K which is formed between the electronic component 20 and the aperture inner peripheral surface 105*f* and which achieves electrical insulation between the electronic component 20 and the aperture inner peripheral surface 105*f*.

The insulating film 51C is formed on at least part of the outer surface of the card body 10 including the aperture inner peripheral surface 105*f*. The insulating film 51C is formed on at least the aperture inner peripheral surface 105*f* of the first card substrate 101. In the present modification, the insulating film 51C is formed to cover only the aperture inner peripheral surface 105*f*.

The insulating film 51C can be formed of, for example, an insulating coating material having electrical insulation properties. The insulating film 51C is formed of a coating film of an insulating coating material formed on the aperture inner peripheral surface 105*f*. As the insulating coating material that forms the insulating film 51C, a material corresponding to that of the insulating film 51A in the above-described modification can be employed.

The insulating film 51C prevents the conductor exposed portions 201 of the outer peripheral surface 21*f*, 22*f* of the electronic component 20 from directly coming into contact with the first card substrate 101. It is therefore possible to more effectively prevent an electrical short circuit between the card body 10 containing a metal material and the electronic components 20 disposed inside the respective apertures 105 formed in the card body 10.

Fourth Embodiment of Card Medium

Figure 20:
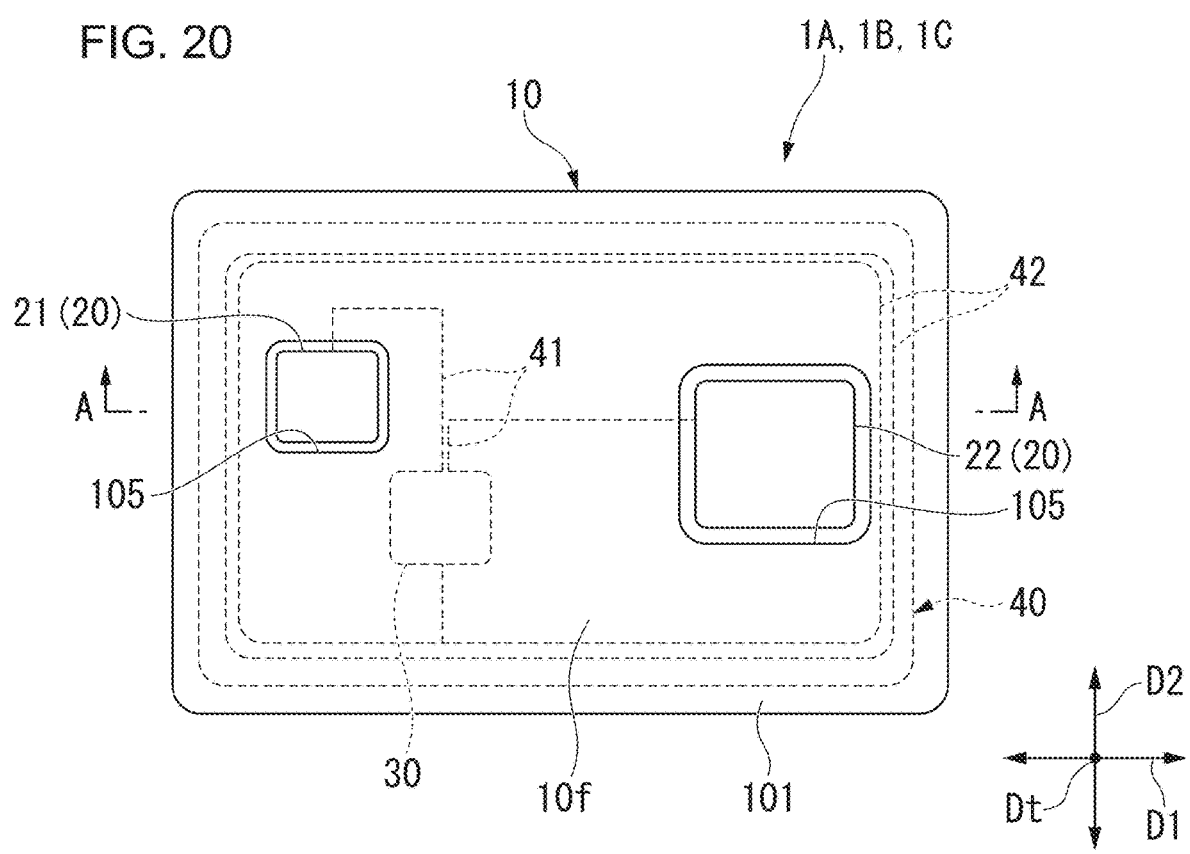
FIG. 20 is a view of the external appearance of an IC card according to a fourth embodiment of the present invention, viewed from its front side.
Figure 21:
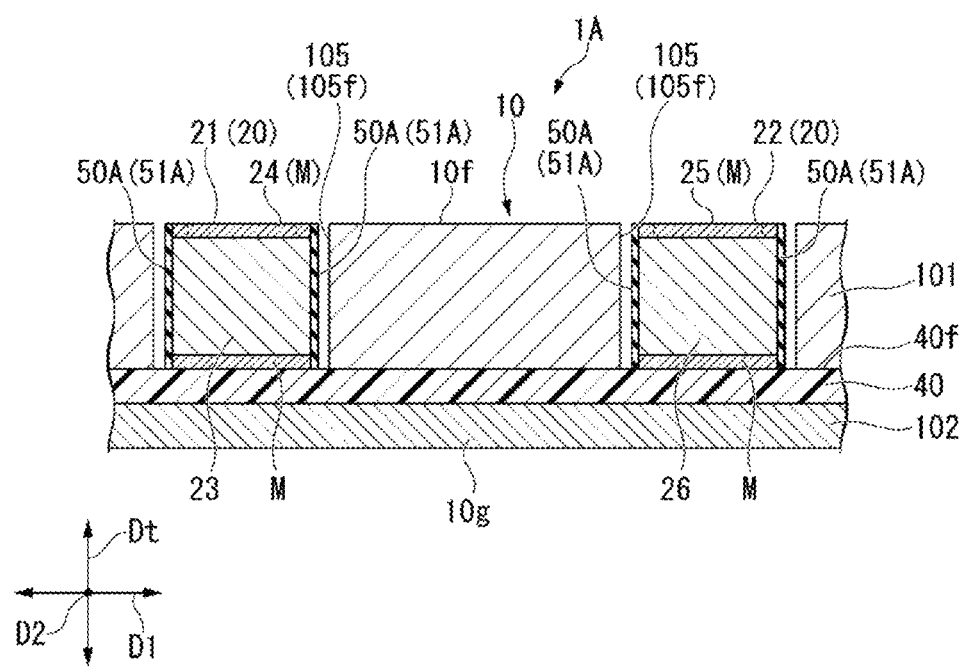
FIG. 21 is a cross-sectional view of FIG. 20.

An IC card according to a fourth embodiment of the present invention will be described below with reference to FIGS. 20 to 24. FIG. 20 is a view of the external appearance of the IC card according to the fourth embodiment, viewed from its front side. FIG. 21 is a cross-sectional view taken along line A-A in FIG. 20. In the following description, the same reference characters are assigned to components in common with components already described, and redundant description is omitted.

As illustrated in FIG. 20, an IC card (card medium) 1A is a dual interface IC card including the contact terminal 21 and the antenna 42. The IC card 1A mainly includes the card body 10, the exposed components (electronic components) 20, and the circuit substrate 40. The card body 10 corresponds to that in the first embodiment.

As illustrated in FIG. 21, the card body 10 is composed of a plurality of sheet-like card substrates 101 and 102 stacked in the card thickness direction Dt.

The first card substrate 101 is disposed at the front surface 10*f* of the card body 10. The configuration of the aperture 105 of the first card substrate 101 corresponds to that in the first embodiment.

The second card substrate 102 is disposed at the rear surface 10*g* of the card body 10. The first card substrate 101 and the second card substrate 102 correspond to those in the first embodiment.

The exposed component 20 is arranged to have a part thereof exposed at the front surface 10*f* of the card body 10.

The IC card 1A may include, for example, the contact terminal 21 and the fingerprint sensor 22 as the exposed components 20. The contact terminal 21 and the fingerprint sensor 22 are respectively disposed in the apertures 105 formed in the card body 10.

The contact terminal 21 is formed in a rectangular shape when viewed in the card thickness direction Dt. The contact terminal 21 includes the substrate 23 and the terminal body 24. The substrate 23 and the terminal body 24 correspond to those in the first embodiment.

The fingerprint sensor 22 is formed in a rectangular plate shape when viewed in the card thickness direction Dt. The fingerprint sensor 22 has the electrode portion 25 and the substrate 26. The electrode portion 25 and the substrate 26 correspond to those in the first embodiment.

As illustrated in FIG. 20, the IC chip 30 is embedded into the card body 10. The IC chip 30 and the circuit substrate 40 correspond to those in the first embodiment.

As illustrated in FIG. 21, the circuit substrate 40 is disposed closer to the rear surface 10*g* of the card body 10 in the card thickness direction Dt than the contact terminal 21, fingerprint sensor 22, and IC chip 30 are. The contact terminal 21, the fingerprint sensor 22, and the IC chip 30 are mounted on a substrate surface 40*f* (mounting surface) that faces in the same direction as the front surface 10*f* of the card body 10.

The antenna 42 is provided on the circuit substrate 40. The antenna 42 has a configuration corresponding to that in the first embodiment.

Figure 22:
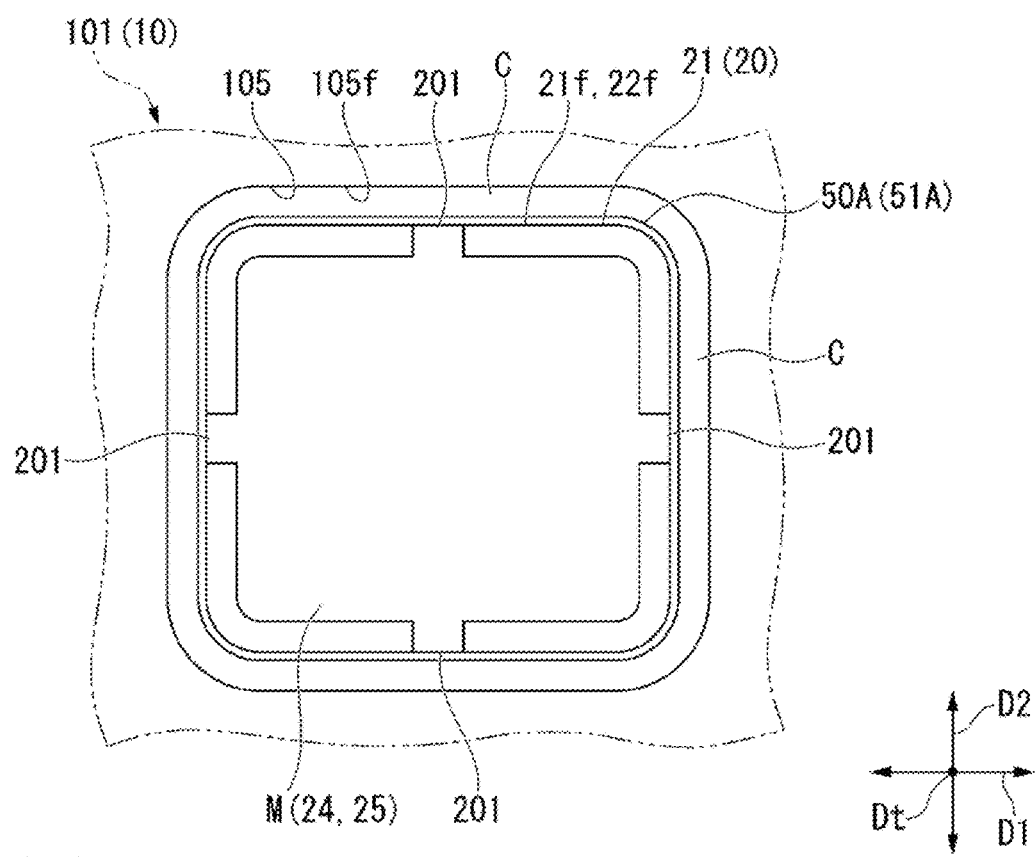
FIG. 22 is a plan view illustrating an exposed component disposed in an aperture of a card body.

FIG. 22 is a plan view illustrating the exposed component disposed in the aperture of the card body. The contact terminal 21 and the fingerprint sensor 22 are arranged in the respective apertures 105 in the same manner. FIG. 22 illustrates a case where the electronic component is the contact terminal 21 and a case where the electronic component is the fingerprint sensor 22 in a single drawing.

Each of the contact terminal 21 and the fingerprint sensor 22, which are the exposed components 20, is disposed with the clearance C provided from the aperture inner peripheral surface 105*f* of the aperture 105.

As illustrated in FIG. 22, the contact terminal 21 and the fingerprint sensor 22 respectively have the outer peripheral surfaces 21*f* and 22*f* corresponding to those in the first embodiment. The conductor exposed portions 201 are formed on parts of the outer peripheral surface 21*f* of the contact terminal 21 and parts of the outer peripheral surface 22*f* of the fingerprint sensor 22. The conductor exposed portion 201 is formed of a conductor having conductive properties. The conductor exposed portion 201 is produced when the terminal body 24 made of the plating layer M is formed by a plating process in the contact terminal 21.

Figure 23:
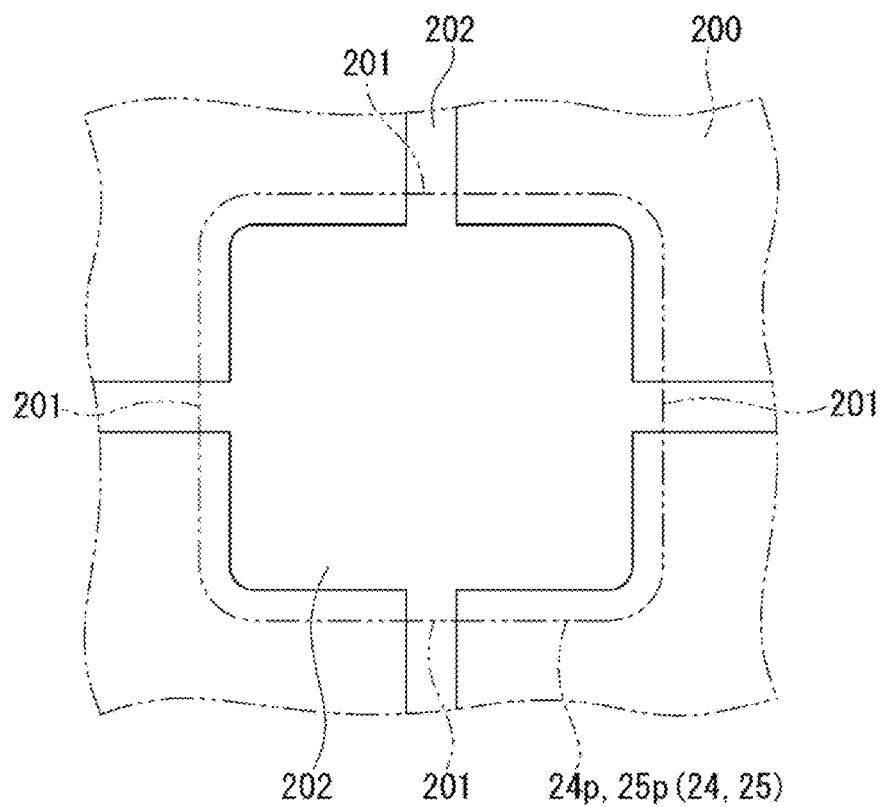
FIG. 23 is a plan view illustrating a wiring portion formed for performing a plating process when the exposed component is formed.

FIG. 23 is a plan view illustrating a conductive pattern formed on the substrate 200. The conductive pattern is formed for performing a plating process when forming the exposed component. A method for forming the conductive pattern corresponds to that in the first embodiment, and the terminal body 21 and the electrode portion 22 as the exposed components 20 are obtained by cutting the substrate 200. A cut surface of the conductive pattern 202, that is, the conductor exposed portion 201, where the conductor is exposed, is formed at parts of the outer peripheral surface 21*f* of the contact terminal 21 and the outer peripheral surface 22*f* of the fingerprint sensor 22 obtained in this manner.

As illustrated in FIG. 21 and FIG. 22, the IC card 1A includes an electrical insulation portion 50A between the contact terminal 21 or the fingerprint sensor 22, which is the exposed component 20, and the aperture inner peripheral surface 105f. In the present embodiment, the electrical insulation portion 50A is formed of an insulating film 51A. The insulating film 51A is formed on at least part of an outer surface of the exposed component 20 (for example, the contact terminal 21, the fingerprint sensor 22) including the conductor exposed portions 201. The insulating film 51A is formed on at least the outer peripheral surface 21f of the contact terminal 21 and the outer peripheral surface 22f of the fingerprint sensor 22. In the present embodiment, the insulating film 51A is formed to cover only the outer peripheral surface 21f of the contact terminal 21 and the outer peripheral surface 22f of the fingerprint sensor 22.

The insulating film 51A is formed on the outer peripheral surface 21f of the contact terminal 21 or the outer peripheral surface 22f of the fingerprint sensor 22. The insulating film 51A is formed of an insulating coating material having electrical insulation properties. The insulating film 51A is formed of a coating film of the insulating coating material. As the insulating coating material that forms the insulating film 51A, a material corresponding to that of the insulating film 51A in the modification of the first embodiment can be employed.

In the present embodiment, the clearance C between the outer peripheral surface 21f of the contact terminal 21 or the outer peripheral surface 22f of the fingerprint sensor 22, and the aperture inner peripheral surface 105f of the aperture 105 is set at, for example, approximately 0.1 mm. In this case, the thickness of the insulating film 51A is preferably set at approximately 5 µm to 100 µm.

A method for producing the IC card 1A will be described next.

Figure 24:
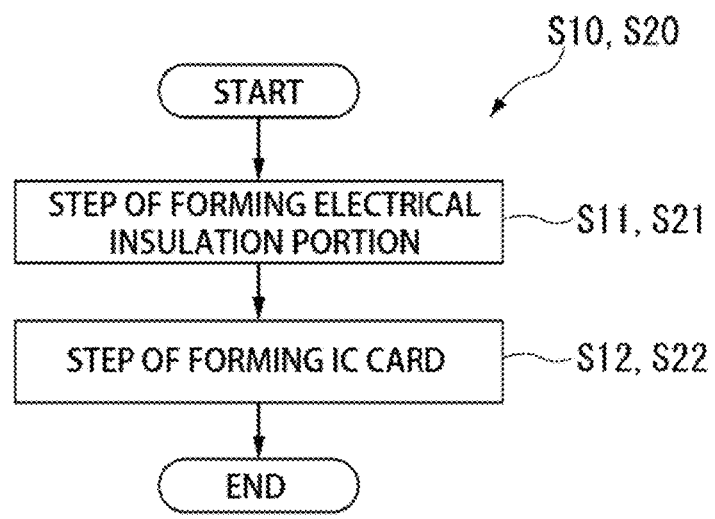
FIG. 24 is a flowchart illustrating the flow of a method for producing the IC card.

FIG. 24 is a flowchart illustrating a method for producing the IC card. As illustrated in FIG. 24, a method S10 for producing the IC card 1A includes a step S11 of forming the electrical insulation portion 50A and a step S12 of forming the IC card 1A.

In the step S11 of forming the electrical insulation portion 50A, the insulating film 51A is formed on the outer peripheral surface 21f of the contact terminal 21 or the outer peripheral surface 22f of the fingerprint sensor 22, which is the exposed component 20. To form the insulating film 51A, the insulating coating material as described above is applied to the outer peripheral surface 21f of the contact terminal 21 or the outer peripheral surface 22f of the fingerprint sensor 22 using a method such as, for example, hand painting, spraying, or dipping (immersion) into a solution of the insulating coating material. In the case where the insulating film 51A is formed using these methods, a portion on an outer surface of the contact terminal 21 or an outer surface of the fingerprint sensor 22 other than a portion where the insulating film 51A is to be formed (such as, for example, the terminal body 24 or the electrode portion 25) is preferably masked with an appropriate protective sheet (masking material). The protective sheet is removed after the insulating film 51A is formed.

After the insulating film 51A is formed in this manner, the contact terminal 21 and the fingerprint sensor 22 are mounted on the circuit substrate 40.

In the step S12 of forming the IC card 1A, the IC card 1A is assembled by stacking the card substrates 101 and 102, which constitute the card body 10, and the circuit substrate 40 including the electronic components 20. The circuit substrate 40 is disposed between the first card substrate 101 and the second card substrate 102. In this situation, the exposed components 20 are disposed in the respective apertures 105 of the first card substrate 101. Then, the first card substrate 101 is joined to the second card substrate 102 by thermoforming or the like. As a result, the IC card 1A is obtained.

The IC card 1A according to the present embodiment includes the electrical insulation portion 50A between the exposed components 20 and the respective aperture inner peripheral surfaces 105f. As the electrical insulation portion 50A, the insulating film 51A covering the outer peripheral surface 21f, 22f of the exposed component 20 is formed. The conductor exposed portions 201 on the outer peripheral surface 21f, 22f of the exposed component 20 are covered with the insulating film 51A. It is therefore possible to prevent an electrical short circuit between the first card substrate 101 of the card body 10 containing a metal material and the exposed components 20 disposed inside the respective apertures 105 formed in the card body 10.

The IC card 1A according to the present embodiment can achieve both good exterior design of the card body containing a metal material and good operational stability of the exposed components.

Modification of Fourth Embodiment

Although in the fourth embodiment, an example has been described where the insulating film 51A constituting the electrical insulation portion 50A is formed on the outer peripheral surface 21f of the contact terminal 21 or the outer peripheral surface 22f of the fingerprint sensor 22, which is the exposed component 20, an aspect of the card medium is not limited to this.

Figure 25:
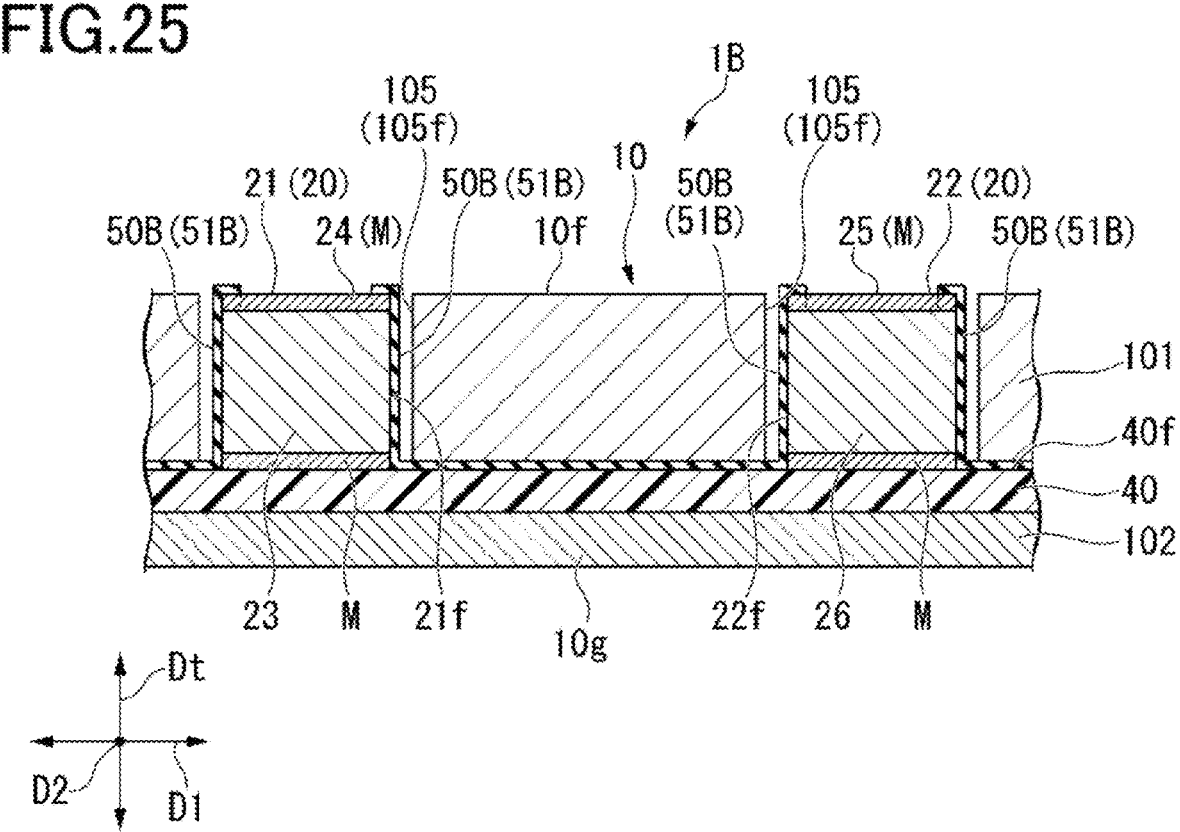
FIG. 25 is a cross-sectional view illustrating an IC card according to a modification of the fourth embodiment of the present invention.

For example, as in an IC card (card medium) 1B illustrated in FIG. 25, an insulating film 51B constituting an electrical insulation portion 50B may be formed to cover the outer peripheral surface 21f of the contact terminal 21 or the outer peripheral surface 22f of the fingerprint sensor 22, which is the exposed component 20, and the substrate surface 40f of the circuit substrate 40. In this case, in the step S11 of forming the electrical insulation portion 50B, after the contact terminal 21 or the fingerprint sensor 22, which is the exposed component 20, is mounted on the substrate surface 40f of the circuit substrate 40, the insulating film 51B is formed. To form the insulating film 51B, a portion on the outer surface of the contact terminal 21 or the outer surface of the fingerprint sensor 22 other than a portion where the insulating film 51B is to be formed (such as, for example, the terminal body 24 or the electrode portion 25) is masked with an appropriate protective sheet (masking material). The protective sheet is removed after the insulating film 51B is formed. As a result, the insulating film 51B is formed on the outer peripheral surface 21f of the contact terminal 21 or the outer peripheral surface 22f of the fingerprint sensor 22, and the substrate surface 40f, which is a mounting surface. In the example illustrated in FIG. 25, the insulating film 51B is continuously formed from the outer peripheral surface 21f of the contact terminal 21 or the outer peripheral surface 22f of the fingerprint sensor 22 to the substrate surface 40f of the circuit substrate 40. FIG. 25 illustrates an example where the insulating film 51B is formed also between the first card substrate 101 and the second card substrate 102. However, the insulating film 51B only needs to be formed on at least a portion of the substrate surface 40f that is exposed between the outer peripheral surface 21f, 22f of the exposed component 20 and the aperture inner peripheral surface 105f.

Fifth Embodiment

A card medium according to a fifth embodiment of the present invention will be described with reference to the drawings. In the following description, the same reference characters are assigned to components in common with components already described, and redundant description is omitted. Note that the following embodiment is different from the fourth embodiment in an electrical insulation portion 50C. Accordingly, in the following description, differences from the fourth embodiment will be mainly described.

Figure 26:
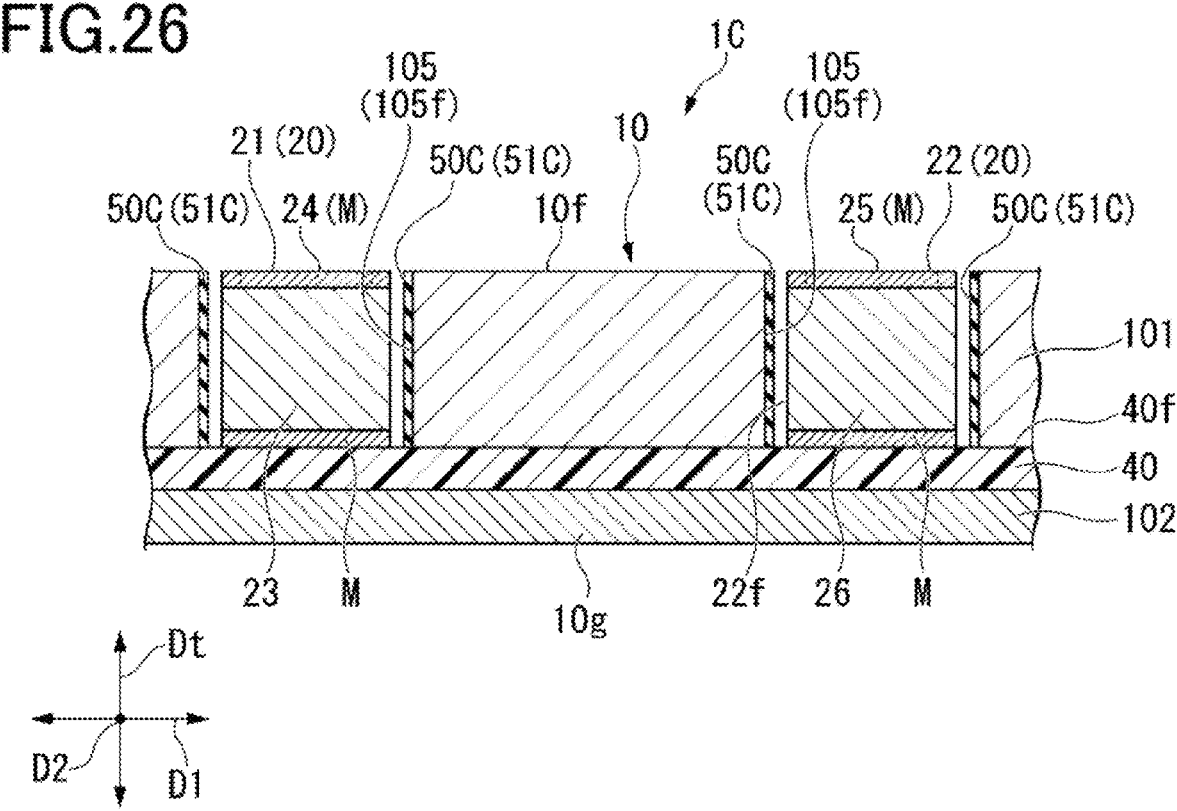
FIG. 26 is a cross-sectional view illustrating an IC card according to a fifth embodiment of the present invention.

FIG. 26 is a cross-sectional view illustrating the IC card according to the fifth embodiment.

As illustrated in FIG. 26, an IC card (card medium) 1C is a dual interface IC card including the contact terminal 21 and the antenna 42 (see FIG. 20). The contact terminal 21 is a contact type interface. The antenna 42 is a contactless type interface. The IC card 1C has a biometric authentication function using the fingerprint sensor 22. The IC card 1C mainly includes the card body 10, the exposed components 20, and the circuit substrate 40.

The IC card 1C includes the electrical insulation portion 50C between the contact terminal 21, which is the exposed component 20, and the aperture inner peripheral surface 105f and between the fingerprint sensor 22 and the aperture inner peripheral surface 105f.

The electrical insulation portion 50C is formed of an insulating film 51C. The insulating film 51C is formed on at least part of an outer surface of the card body 10 including the aperture inner peripheral surface 105f. The insulating film 51C is formed on at least the aperture inner peripheral surface 105f of the first card substrate 101. In the present embodiment, the insulating film 51C is formed to cover only the aperture inner peripheral surface 105f.

The insulating film 51C can be formed of, for example, an insulating coating material having electrical insulation properties. The insulating film 51C is made of a coating film of an insulating coating material formed on the aperture inner peripheral surface 105f. As the insulating coating material that forms the insulating film 51C, an insulating coating material corresponding to that of the insulating film 51A in the modification of the first embodiment can be employed.

A method for producing the IC card 1C according to the present embodiment will be described next.

As illustrated in FIG. 24, a method S20 for producing the IC card 1C includes a step S21 of forming the electrical insulation portion 50C and a step S22 of forming the IC card 1C.

In the step S21 of forming the electrical insulation portion 50C, the insulating film 51C is formed on the aperture inner peripheral surface 105f of the aperture 105 in the first card substrate 101 of the IC card 1C. In the case where the insulating coating material is used for the insulating film 51C, the insulating coating material is applied using a method such as hand painting, spraying, or dipping (immersion) into a solution of the insulating coasting material. In the case where an oxide film is used as the insulating film 51C, for example, the oxide film is formed through immersion of the first card substrate 101 into an oxidizing solution such as nitric acid, heat treatment of the first card substrate 101 in an oxidizing atmosphere, or the like. In the case where an insulating polymer is used for the insulating film 51C, the insulating film 51C is formed by immersing the first card substrate 101 into a polymer solution.

In the case where the insulating film 51C is formed using process of immersion into a solution, a portion on the outer surface of the first card substrate 101 other than a portion where the insulating film 51c is to be formed (for example, the front surface 10f of the card body 10) is preferably masked with a protective sheet or a masking material as appropriate. The protective sheet is removed after the insulating film 51C is formed.

In the step S12 of forming the IC card 1C, the IC card 1C is assembled by stacking the card substrates 101 and 102, which constitute the card body 10, and the circuit substrate 40 on which the exposed components 20 are mounted. The circuit substrate 40 is disposed between the first card substrate 101 and the second card substrate 102. In this situation, the exposed components 20 are disposed in the respective apertures 105 of the first card substrate 101. Then, the first card substrate 101 is joined to the second card substrate 102 by thermocompression or the like. As a result, the IC card 1C is obtained.

The IC card 1C according to the present embodiment includes the electrical insulation portion 50C between the exposed components 20 and the respective aperture inner peripheral surfaces 105f. As the electrical insulation portion 50C, an insulating film 51C is formed that covers the aperture inner peripheral surface 105f of the aperture 105 in which the exposed component 20 is disposed. Such an insulating film 51C prevents the conductor exposed portions 201 of the outer peripheral surface 21f, 22f of the exposed component 20 from directly coming into contact with the first card substrate 101. It is therefore possible to prevent an electrical short circuit between the card body 10 containing a metal material and the exposed components 20 disposed inside the respective apertures 105 formed in the card body 10.

The IC card 1C according to the present embodiment can achieve both good exterior design of the card body containing a metal material and good operational stability of the exposed components.

While the embodiments of the present invention have been described in detail above with reference to the drawings, specific configurations are not limited to the embodiments and encompass changes, combinations, and the like, within a range not deviating from the gist of the present invention.

For example, components mounted as the electronic components 20D, or the exposed components (electronic components) 20, are not limited to the contact terminal 21, the fingerprint sensor 22, and the IC chip 30, and other components may be mounted as appropriate. While in the above-described embodiments, an example has been described where two types (two pieces) of the electronic components 20D and the exposed components (electronic components) 20, namely the contact terminal 21 and the fingerprint sensor 22, are provided, the configuration of the card medium is not limited to this. Types, the number, and combination of the electronic components 20D and the exposed components (electronic components) 20 can be changed as appropriate.

While in the above-described modifications of the embodiments, the insulating films 51A to 51C are provided on either the electronic components 20D and the exposed components (electronic components) 20, or the apertures 105 of the card body 10, the configuration of the card medium is not limited to this. For example, the insulating films 51A to 51C may be formed on both the electronic components 20D and the exposed components (electronic components) 20 including the conductor exposed portions 201, and the card body 10 including the aperture inner peripheral surfaces 105f.

The electrical insulation portion may be formed by filling the clearance C between the outer peripheral surface 21f, 22f of the fingerprint sensor 22 and the aperture inner peripheral surface 105f of the aperture 105 with an insulating material.

While the IC cards 1A to 1F to be used as a credit card have been exemplified as the card medium, a form and application of the card medium are not limited.

INDUSTRIAL APPLICABILITY

The card mediums and the electronic components for the card medium according to the embodiments provide card mediums and electronic components for the card mediums which are capable of preventing an electrical short circuit between a card body containing a metal material and an electronic component disposed inside an aperture formed in the card body.

The card mediums according to the embodiments provide card mediums capable of achieving both good exterior design of a card body containing a metal material and good operational stability of an exposed component.

The card mediums and the metal card substrates for the card mediums according to the embodiments provide card mediums and metal card substrates for the card mediums which are capable of preventing an electrical short circuit between a card body containing a metal material and an electronic component disposed inside an aperture formed in the card body.

[Reference Signs List] 1A, 1B, 1C, 1D, 1E, IF, 1G, 1H, 1J, 1K . . . IC card (card medium); 10 . . . Card body; 10f . . . Front surface; 20, 20D . . . Electronic component (exposed component); 21f, 22f . . . Outer peripheral surface; 40 . . . Circuit substrate; 50A, 50B, 50C, 50D, 50E, 50F, 50G, 50H, 50J, 50K . . . Electrical insulation portion; 51A, 51B, 51C . . . Insulating film; 53 . . . Outer peripheral recess portion; 55, 57 . . . Inner peripheral recess portion; 101 . . . First card substrate; 105, 105H . . . Aperture; 105f . . . Aperture inner peripheral surface; 201 . . . Conductor exposed portion; 205 . . . Electronic component body; 207 . . . Outer peripheral insulating portion; Dt . . . Card thickness direction.

What is claimed is:

1. A card medium, comprising:
a card body containing a metal material, the card body having at least one aperture at a front surface thereof, the at least one aperture having an inner peripheral surface as an aperture inner peripheral surface;
an electronic component disposed in the at least one aperture and having an outer peripheral surface facing the aperture inner peripheral surface with a clearance provided between the outer peripheral surface and the aperture inner peripheral surface, at least part of the outer peripheral surface including a conductor exposed portion at which a conductor having conductive properties is exposed;
a circuit substrate which is embedded into the card body and to which the electronic component is joined; and
an electrical insulation portion provided between the electronic component and the aperture inner peripheral surface, wherein:
the electrical insulation portion includes an outer peripheral recess portion formed at the at least part of the outer peripheral surface, the outer peripheral recess portion being recessed in a direction away from the aperture inner peripheral surface, and wherein:
the electronic component includes:
a plating portion formed inside the at least one aperture at an exposed portion of the electronic component, the exposed portion being exposed at the front surface of the card body, the plating portion having the conductor connected thereto; and
an outer peripheral insulating portion formed at an outer periphery of the electronic component so as to enclose the plating portion except the conductor exposed portion, the outer peripheral insulating portion being formed of a material having electrical insulation properties.

2. The card medium of claim 1, wherein:
the electrical insulation portion includes an insulating film formed on at least one of at least part of an outer surface of the electronic component including the conductor exposed portion and at least part of an outer surface of the card body including the aperture inner peripheral surface.

3. The card medium of claim 2, wherein:
the insulating film is disposed on at least the outer peripheral surface of the electronic component.

4. The card medium of claim 3, wherein:
the insulating film is disposed on a mounting surface of the circuit substrate, the mounting surface having the electronic component mounted thereon.

5. The card medium of claim 2, wherein:
the insulating film is disposed on at least the aperture inner peripheral surface.

6. The card medium of claim 2, wherein:
the insulating film is made of a coating film of an insulating material.

7. The card medium of claim 2, wherein:
the insulating film is made of an oxide film formed on a surface of a metal contained in the card body.

8. The card medium of claim 1, further comprising:
an inner peripheral recess portion provided on the aperture inner peripheral surface at a position including a facing portion that faces the conductor exposed portion with a clearance provided from the conductor exposed portion, the inner peripheral recess portion being recessed in a direction away from the conductor exposed portion.

9. The card medium of claim 8, wherein:
the electrical insulation portion is provided between the inner peripheral recess portion and the conductor exposed portion.

10. The card medium of claim 8, wherein:
the card body has a thickness in a direction as a card thickness direction; and
the inner peripheral recess portion extends from the front surface to the circuit substrate in the card thickness direction.

11. The card medium of claim 8, wherein:
the card body has a thickness in a direction as a card thickness direction; and
the inner peripheral recess portion extends from the front surface to part of the aperture inner peripheral surface in the card thickness direction.

12. A card medium, comprising:
a card body containing a metal material, the card body having at least one aperture at a front surface thereof, the at least one aperture having an inner peripheral surface as an aperture inner peripheral surface;
an electronic component disposed in the at least one aperture and having an outer peripheral surface facing the aperture inner peripheral surface with a clearance provided between the outer peripheral surface and the aperture inner peripheral surface, at least part of the outer peripheral surface including a conductor exposed portion at which a conductor having conductive properties is exposed;

a circuit substrate which is embedded into the card body and to which the electronic component is joined; and an electrical insulation portion provided between the electronic component and the aperture inner peripheral surface, wherein:

the electrical insulation portion includes an insulating film formed on at least one of at least part of an outer surface of the electronic component including the conductor exposed portion and at least part of an outer surface of the card body including the aperture inner peripheral surface, and the insulating film is made of an oxide film formed on a surface of a metal contained in the card body.

13. The card medium of claim 12, further comprising:

an inner peripheral recess portion provided on the aperture inner peripheral surface at a position including a facing portion that faces the conductor exposed portion with a clearance provided from the conductor exposed portion, the inner peripheral recess portion being recessed in a direction away from the conductor exposed portion.

14. The card medium of claim 13, wherein:

the electrical insulation portion is provided between the inner peripheral recess portion and the conductor exposed portion.

15. The card medium of claim 13, wherein:

the card body has a thickness in a direction as a card thickness direction; and the inner peripheral recess portion extends from the front surface to the circuit substrate in the card thickness direction.

16. The card medium of claim 13, wherein:

the card body has a thickness in a direction as a card thickness direction; and the inner peripheral recess portion extends from the front surface to part of the aperture inner peripheral surface in the card thickness direction.

17. A card medium, comprising:

a card body containing a metal material, the card body having at least one aperture at a front surface thereof, the at least one aperture having an inner peripheral surface as an aperture inner peripheral surface;

an electronic component disposed in the at least one aperture and having an outer peripheral surface facing the aperture inner peripheral surface with a clearance provided between the outer peripheral surface and the aperture inner peripheral surface, at least part of the outer peripheral surface including a conductor exposed portion at which a conductor having conductive properties is exposed;

a circuit substrate which is embedded into the card body and to which the electronic component is joined;

an electrical insulation portion provided between the electronic component and the aperture inner peripheral surface; and an inner peripheral recess portion provided on the aperture inner peripheral surface at a position including a facing portion that faces the conductor exposed portion with a clearance provided from the conductor exposed portion, the inner peripheral recess portion being recessed in a direction away from the conductor exposed portion.

18. The card medium of claim 17, wherein:

the electrical insulation portion is provided between the inner peripheral recess portion and the conductor exposed portion.

19. The card medium of claim 17, wherein:

the card body has a thickness in a direction as a card thickness direction; and the inner peripheral recess portion extends from the front surface to the circuit substrate in the card thickness direction.

20. The card medium of claim 17, wherein:

the card body has a thickness in a direction as a card thickness direction; and the inner peripheral recess portion extends from the front surface to part of the aperture inner peripheral surface in the card thickness direction.

* * * * *